(12) United States Patent
Li et al.

(10) Patent No.: US 10,629,153 B2
(45) Date of Patent: Apr. 21, 2020

(54) BACKPLANE SUITABLE TO FORM PART OF AN EMISSIVE PIXEL ARRAY AND SYSTEM AND METHODS OF MODULATING SAME

(71) Applicant: Jasper Display Corp., Hsinchu (TW)

(72) Inventors: Bo Li, Santa Clara, CA (US); Kaushik Sheth, Los Altos, CA (US); James Michael Stover, Santa Clara, CA (US); Edwin Lyle Hudson, Santa Clara, CA (US); David Charles McDonald, Santa Clara, CA (US); Jeffrey Tang Fung Li, Santa Clara, CA (US)

(73) Assignee: JASPER DISPLAY CORP., Hsinchu (TW)

( * ) Notice: Subject to any disclaimer, the term of this patent is extended or adjusted under 35 U.S.C. 154(b) by 0 days.

(21) Appl. No.: 16/152,559

(22) Filed: Oct. 5, 2018

(65) Prior Publication Data

US 2019/0114987 A1    Apr. 18, 2019

Related U.S. Application Data

(60) Provisional application No. 62/571,839, filed on Oct. 13, 2017.

(51) Int. Cl.
*G09G 3/36* (2006.01)
*H04N 9/31* (2006.01)
*G09G 3/3233* (2016.01)

(52) U.S. Cl.
CPC ......... *G09G 3/3685* (2013.01); *G09G 3/3233* (2013.01); *H04N 9/312* (2013.01);
(Continued)

(58) Field of Classification Search
CPC .............. G09G 3/3685; G09G 3/3233; G09G 2300/0452; G09G 2300/0857; H04N 9/312
See application file for complete search history.

(56) References Cited

U.S. PATENT DOCUMENTS 6,151,011 A    11/2000   Worley, III et al.
6,201,521 B1   3/2001    Doherty
(Continued)

OTHER PUBLICATIONS

Ong, "Modem MOS Technology: Processes, Devices and Design", 1984, pp. 207-209, (SRAM), 230-231, (Current Sources), 1984, McGraw-Hill, New York, USA.
(Continued)

*Primary Examiner* — Lisa S Landis
(74) *Attorney, Agent, or Firm* — WPAT, PC

(57) ABSTRACT

A backplane operative to drive an array of emissive pixel elements is disclosed. Each pixel element comprises a pixel circuit drive element and an emissive element, wherein the pixel circuit drive element comprises a memory cell, a current source element, and a modulation element. The present invention improves on an emissive display by providing a backplane and modulation system that enables fabrication of multi-color or monochrome LED display systems that operate efficiently and without objectionable image artifacts. One aspect of the present invention is to realize the backplane in a single crystal silicon process with a minimum number of metal layers while providing each color with a suitable operating voltage and drive current.

14 Claims, 16 Drawing Sheets

(52) U.S. Cl.
CPC .............. *G09G 2300/0452* (2013.01); *G09G 2300/0857* (2013.01)

(56) References Cited

U.S. PATENT DOCUMENTS

| | | |
|---|---|---|
| 7,443,374 B2 | 10/2008 | Hudson |
| 7,468,717 B2 | 12/2008 | Hudson |
| 7,852,307 B2 | 12/2010 | Hudson |
| 8,264,507 B2 | 9/2012 | Hudson et al. |
| 8,421,828 B2 | 4/2013 | Hudson et al. |
| 9,406,269 B2 | 8/2016 | Lo et al. |
| 9,583,031 B2 | 2/2017 | Hudson et al. |
| 9,918,053 B2 | 3/2018 | Lo et al. |
| 2009/0115703 A1* | 5/2009 | Cok ................ G09G 3/3233 345/76 |

OTHER PUBLICATIONS

"2114A 1024 × 4 Bit Static RAM", Component Data Catalog, Intel Corp., 1982. Santa Clara, CA, USA.

* cited by examiner

| | 1 | 2 | 3 | 4 | 5 | 6 | 7 | 8 | 9 | 10 | 11 | 12 | 13 | 14 | 15 | 16 | 17 | 18 |
|---|---|---|---|---|---|---|---|---|---|---|---|---|---|---|---|---|---|---|
| 1 | A1 | | | | | | | | | | | | | | | | | |
| 2 | | B1 | | | | | | | | | | | | | | | | |
| 3 | | | C1 | | | | A2 | | | | | | | | | | | |
| 4 | | | | D1 | | | | B2 | | | | | | | | | | |
| 5 | | | | | | | | | C2 | | | | | A3 | | | | |
| 6 | | | | | | | | | | D2 | | | | | B3 | | | |
| 7 | | | | | E1 | | | | | | | | | | | C3 | | |
| 8 | | | | | | F1 | | | | | | | | | | | D3 | |
| 9 | | | | | | | | | | | E2 | | | | | | | |
| 10 | | | | | | | | | | | | F2 | | | | | | |
| 11 | | | | | | | | | | | | | | | | | E3 | |
| 12 | | | | | | | | | | | | | | | | | | F3 |

Time ⟶

FIG 5

BACKPLANE SUITABLE TO FORM PART OF AN EMISSIVE PIXEL ARRAY AND SYSTEM AND METHODS OF MODULATING SAME

CROSS REFERENCE TO RELATED APPLICATION

This present application claims the benefit of U.S. Provisional Patent Application No. 62/571,839, filed on Oct. 13, 2017.

FIELD OF THE INVENTION

The present invention relates to the design of a backplane useful to drive an array of pixels comprising emissive display elements at each pixel and to a display fabricated with such a backplane. More particularly, the present invention relates to a backplane and backplane controller operative to pulse-width modulate each emissive pixel to create a gray scale modulation, and to methods of implementing the modulation.

BACKGROUND OF THE INVENTION

Emissive displays have proved useful for a variety of applications. For example, plasma display panels (PDPs) were at one time the leading flat panel display technology. More recently, displays using organic light emitting diode (OLED) technology have gained favor, most recently as a display component for useful devices such as mobile telephones, automobile radios, and many other consumer products. Some applications that are not display oriented have been postulated, including use as a pixilated emissive device in an additive manufacturing device. Additionally, an emissive array of pixels has been proposed for use as components for an automotive head lamp system.

More recently, emissive display system developers have demonstrated emissive displays based on backplanes driving small LEDs with a pitch between adjacent pixels of 17 micrometers (hereafter microns or μm) or less. These small LEDs are commonly termed microLEDs or μLEDs. LEDs are designed to exploit the band gap characteristic of semiconductors in which use of a suitable voltage to drive the LED will cause electrons within the LED to combine with electron holes, resulting in the release of energy in the form of photons, a feature referred to as electroluminescence. Those of skill in the art will recognize that semiconductors suitable for LED applications may include trace amounts of dopant material to facilitate the formation of electron holes.

The choice of semiconductor materials to form an LED will vary by application. In some applications for visual displays one monochrome color may be desirable, resulting in the use of a single semiconductor material for the LEDs of all pixels. In other applications, a full range of colors may be required, which will result in a requirement for three or more semiconductor materials configured to radiate, for example, red, green and blue or combinations thereof. In the case of additive manufacturing, a semiconductor material may be selected such that it emits radiation at a wavelength suitable for it to act as actinic radiation on a material used in the additive manufacturing process.

All potential variations are included within the scope of the present invention.

It is well known that LEDs made of different semiconductor materials may differ from each other in a number of important manners. First, the ideal drive voltage may differ from one material to another for various reasons. Second, the required current to reach a desired emission level may differ. For a multicolor display, it is important that the LEDs for each color be driven so that the relative intensities of the color meet the color balance desired for a display. This requirement is well known in the art although means for achieving it are variously understood.

It is well known that a preferred means for controlling the apparent intensity of an LED is pulse width modulation, also referred to as duty cycle modulation. Pulse width modulation is preferred because, as is well known in that art, voltage modulation of an LED often results in a shift in the color emitted by the LED, thereby complicating the task of maintaining color balance within the display. Such pulse width modulation necessarily requires that the rate at which pulses occur must be very rapid compared to the visual characteristics of human vision. This characteristic is typically referred to as critical flicker frequency or flicker fusion frequency. It is the frequency at which a human observer perceives a flashing light as a steady light.

As a practical matter, when gray scale is created using pulse width modulation, control of the intensity of an LED through pulse width modulation should be implemented separately from the creation of gray scale through pulse width modulation in order to ensure that full gray scale capability is retained. In that case, the pulse rate of the waveform used to create the duty cycle modulation of the LED to control the overall intensity of the LED should operate at a rate that insures that even the shortest duration gray scale modulation step receives a duty cycle "on state" during its operation. Otherwise, gray scale generation may be compromised through unintended aliasing.

SUMMARY OF THE PRESENT INVENTION

It is therefore an object of the present invention to improve on an emissive display by providing a backplane and modulation system that enables fabrication of multicolor or monochrome LED display systems that operate efficiently and without objectionable image artifacts. One aspect of the present invention is to realize the backplane in a single crystal silicon process with a minimum number of metal layers while providing each color with a suitable operating voltage and drive current.

BRIEF DESCRIPTION OF THE DRAWINGS

FIG. 5 presents a modulation scheme for an array of emissive pixels wherein some pixels representing a portion of the colors of an emissive display are located on a row adjoining a row containing pixels representing the remaining colors of an emissive display.

DETAILED DESCRIPTION OF THE INVENTION

Figure 1A:
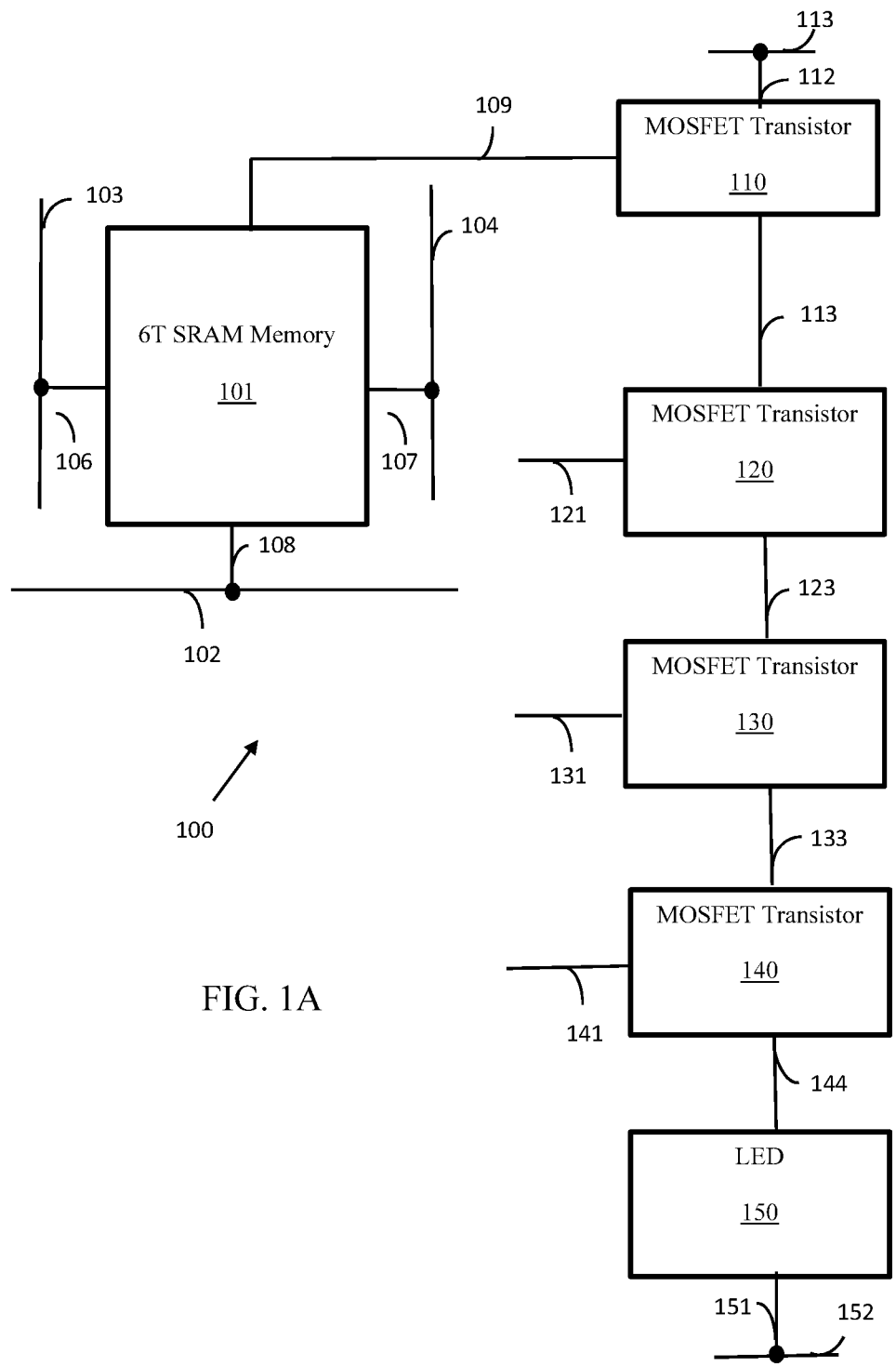
FIG. 1A is a block diagram of a current source backplane of an emissive display after a first embodiment of the present invention.

In the present application, the preceding general description and the following specific description are exemplary and explanatory only and are not restrictive of the invention as claimed. It should be noted that, as used in the specification and the appended claims, the singular forms "a", "an" and "the" include plural referents unless the context clearly dictates otherwise. Thus, for examples, reference to a material may include mixtures of materials; reference to a display may include multiple display, and the like. Use of the word display is synonymous with the term array of pixels as well as other similar terms. A display need not be used as a means for presenting information for human viewing and may include an array of pixels for any use. All references cited herein are hereby incorporated by reference in their entirety, except to the extent that they conflict with teachings explicitly set forth in this specification. The terms MOSFET transistor, FET transistor, FET and transistor are considered to be equivalent. All transistors herein are MOSFET transistors unless otherwise indicated. Those of skill in the art will recognize that equivalent circuits may be created in nMOS silicon or pMOS silicon.

The present application deals with binary data used for pulse width modulation. Although common practice is to use the number 1 to indicate an on state and the number 0 to indicate an off state, this convention is arbitrary and may be reversed, as is well known in the art. Similarly, the use of the terms high and low to indicate on or off is arbitrary and, in the area of circuit design, misleading because p-channel FET transistors are in a conducting state (on) when the gate voltage is low and in a nonconducting state (off) when the gate voltage is high. The use of the word binary is intended to convey the idea that the data represents one of two states. Commonly the two states are referred to as on or off. It does not necessarily follow that the duration in time of binary elements of data is also binary weighted. In emissive displays as those of the present invention, it is often possible for a pixel of the emissive display to achieve an off state that is truly off, in that no noticeable residual leakage of light from that pixel occurs when the data state of the circuit driving a pixel of the emissive device is placed to off.

The term conductor shall mean a conductive material, such as copper, aluminum, or polysilicon, operative to carry a modulated or unmodulated voltage or signal. The word wire shall have the same meaning as the term conductor. The word terminal shall mean a connection point to a circuit element. A terminal may be a conductor or a node or other construct.

One important characteristic of a MOSFET transistor is its threshold voltage. The threshold voltage is the voltage placed on the gate to place it in condition to turn on. The threshold voltage is not fixed for all conditions of the transistor but may instead vary by operating condition. When a p-channel MOSFET transistor is used as a switch, the threshold voltage is normally a lower voltage relative to ground than the off-state voltage.

These and other objects and advantages of the present invention will no doubt become obvious to those of ordinary skill in the art after having read the following detailed description of the preferred embodiments, which is illustrated in the various drawing figures.

FIG. 1A presents block diagram 100 of a current source pixel circuit of an array of pixels after the present invention. The pixel circuit comprises SRAM memory cell 101 and a series chain of four transistors comprising MOSFET transistors 110, 120, 130 and 140 and LED 150. SRAM memory cell is identified as a 6-T cell although the use of other SRAM memory cells with different numbers of transistors is anticipated.

SRAM memory cell 101 is connected to word line (WLINE) 102 by conductor 108. Conductor 108 may represent more than one connection between SRAM memory cell 101 and WLINE 102. Complementary data lines ($B_{POS}$) 103 and ($B_{NEG}$) 104 connect to SRAM memory cell 101 by conductors 106 and 107 respectively. When WLINE 102 is pulled high, pass transistors in the memory cell allow new data to be stored in the memory cell. Data output S_neg of the SRAM is asserted over line 109 onto the gate of MOSFET transistor 109. Operation of the 6T SRAM memory is explained in detail with respect to FIG. 1B.

Those of skill in the art will recall that all MOSFET transistors realized in a CMOS process exhibit a voltage effect that results in a drop between the voltage applied to the source of a MOSFET transistor and the voltage asserted onto its drain. This is inherent in the technology. In this application the convention is to refer to this voltage as Vdelta. The present application assumes all knowledgeable CMOS designers will understand these voltage differences and will plan for them.

The source terminal of MOSFET transistor 110 connects to V_H on line 113 over conductor 112. V_H is a positive voltage suitable to act as the primary originating source voltage for the anode voltage/current source to be applied to each of the pixels intended for the colors of the array of pixels. The data state of SRAM memory 109 is asserted onto the gate terminal of transistor 110 over conductor 109. The threshold voltage of MOSFET transistor 110 is VT1. Transistor 110 acts as a switch by asserting a voltage equivalent to V_H−Vdelta1 onto its drain when the data state of SRAM memory 101 is on (low) and blocking the assertion of voltage onto its drain when the data state of SRAM memory 101 is off (high). In one embodiment V_H is supplied globally to all pixels regardless of the color of the LED associated with each of the pixels.

Those of skill in the art will recall that all transistors may have a level of insertion loss between source and drain and that some transistors may have a significant insertion loss by design. The present application assumes all knowledgeable designers will take these minor voltage drops into account.

When V_H−Vdelta1 is asserted onto the drain of transistor 110, it is asserted over conductor 113 onto the source of MOSFET transistor 120. MOSFET transistor 120, responsive to signals received over its gate on conductor 121, acts as a switch to interrupt the supply of voltages beyond transistor 120. One need for an interrupt is to act as a duty cycle modulation device capable of switching transistor 120 on and off rapidly to act as a dimming function on an LED without changing its color as would be the case if the drive voltage was changed. A second need for an interrupt is to enable all pixels of an array of pixels to initiate emission at substantially the same time. It is anticipated that each color is operated independently of other colors. Therefore, it is possible to operate the display in a manner analogous to a field sequential color device, wherein each color is displayed in sequence. The resulting loss of brightness and duty cycle may be offset by the simplification of the arrangement of data onto the backplane.

The threshold voltage of MOSFET transistor 120 is VT2. The voltage asserted onto the drain of transistor 120 when both MOSFET transistor 110 and MOSFET transistor 120 are "on" is equivalent to V_H−Vdelta1−Vdelta2, wherein Vdelta 2 is the voltage drop between the source and drain of MOSFET transistor 120 and V_H and Vdelta1 are as previously described.

When V_H−Vdelta1−Vdelta2 is asserted onto the drain of transistor 120, it is then asserted onto the source of transistor 130 over conductor 123. Transistor 130 is a large L transistor configured to act as a voltage-controlled resistor. Those of skill in the art will appreciate that a large L transistor, when driven in saturation, may also filter instabilities in the source voltage through a reduction process. A stable bias voltage $V_{BIAS}$ (not shown) is applied to the gate of transistor 130, enabling transistor 130 to deliver a stable, well controlled voltage and current on its drain, wherein voltage $V_{BIAS}$ on its gate determines the delivered voltage. Voltage $V_{BIAS}$ applied to the gate of transistor 130 will vary between colors, based on the band-gap of the LED or other emissive device in use. Transistor 130 may be designed slightly differently for each color, depending on the requirements of the LED to be driven. Those of skill in the art will recognize that transistor 130, when operated in this manner, may form a part of a current source. The drain of MOSFET transistor 130 holds a voltage dependent on the voltage $V_{BIAS}$ applied to the gate.

The voltage asserted onto the drain of transistor 130 is asserted onto the source of MOSFET transistor 140 over conductor 133. MOSFET transistor 140 acts as a blocker operative to protect the output of MOSFET 130 transistor from excessive variations. The gate of transistor 140 is connected to $V_{SS}$ over conductor 141. Current from transistor 140 is asserted over conductor 144, which may be connected to the anode of a suitable emissive device, such as LED 150. The threshold voltage of MOSFET transistor 140 is VT4. The voltage asserted onto the drain of MOSFET transistor 140 is the voltage asserted onto the source of MOSFET transistor 140 less a small reduction factor Vdelta4 due to internal resistance.

To complete a circuit suitable to drive a suitable emissive device, such as an LED, drive voltage V_L must be asserted on the cathode of emissive device 150 over terminal 151 through conductor 152. This circuit can be fabricated in a number of ways. One method comprises using a cover glass coated with Indium-Tin-Oxide (ITO) to enable a global connection to the cathodes of all emissive devices. In one embodiment, a circuit isolated from all other circuits of the backplane is formed within the CMOS backplane to deliver V_L to each pixel or to a collection of pixels. The isolated circuit is most often connected to at least one pad on the wire bond pad. The material used to form the circuit would typically be the most conductive material available in the process in use, typically copper or aluminum. The material used to isolate the circuit may be a non-conductive material, such as $SiO_2$. V_L is a lower voltage than V_H and may be lower than $V_{SS}$ or even may be a negative voltage relative to ground. V_L provides sufficient voltage difference from the voltage applied to the anode of LED 150 to cause LED 150 to discharge light.

In one embodiment, drive voltage V_L is supplied through a series of partitioned circuits configured to drive all pixels on a fixed number of rows, wherein the application of the second drive voltage to each of the emissive devices associated with the pixels of each partition is temporally independent of the application of the second drive voltage to each of the pixels of any other partition. In one embodiment, each partition comprises a number of rows identical to the number of rows of substantially all other partitions. In one embodiment, the number of rows in each partition is an even number.

Figure 1B:
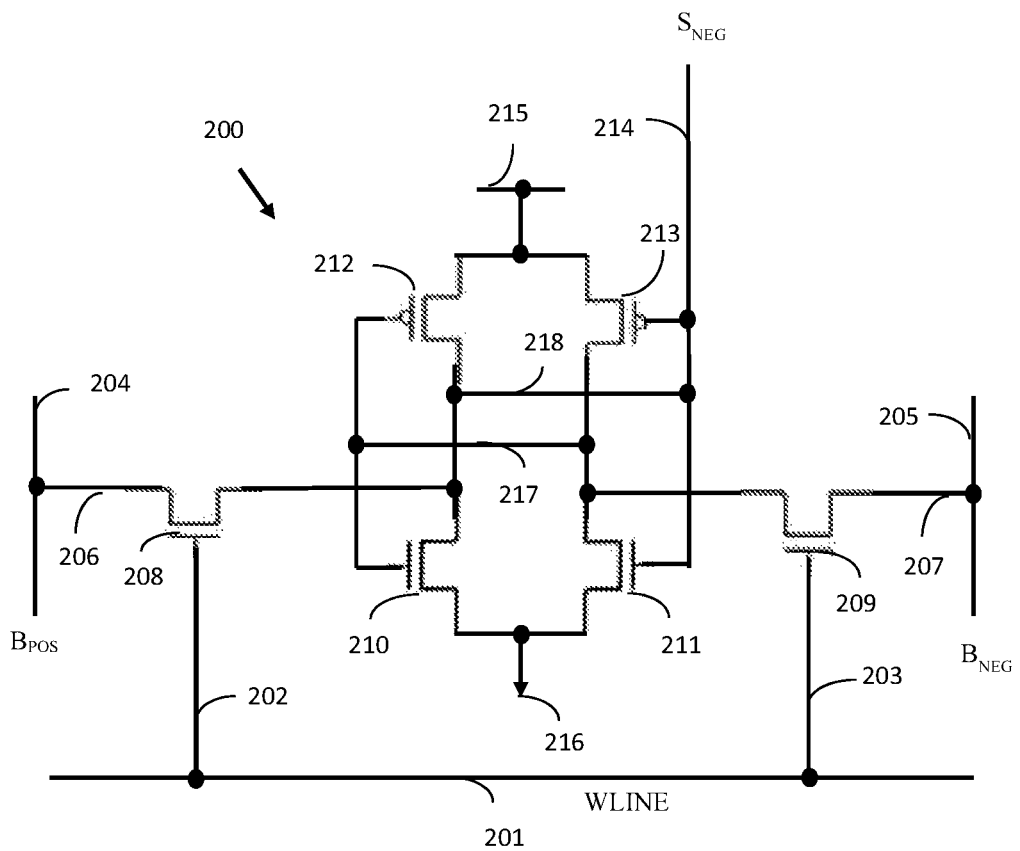
FIG. 1B is a schematic diagram of a 6-transistor static RAM memory for a first embodiment of the present invention.

FIG. 1B shows a preferred embodiment of a storage element 200. Storage element 200 is preferably a CMOS static ram (SRAM) latch device. Such devices are well known in the art. See DeWitt U. Ong, Modern MOS Technology, Processes, Devices, & Design, 1984, Chapter 9 5, the details of which are hereby fully incorporated by reference into the present application. A static RAM is one in which the data is retained as long as power is applied, though no clocks are running FIG. 1B shows the most common implementation of an SRAM cell in which six transistors are used. MOSFET transistors 208, 209, 210, and 211 are n-channel transistors, while MOSFET transistors 212, and 213 are p-channel transistors. In this particular design, word line 201, when held high, turns on pass transistors 208 and 209 by asserting the state of WLINE 201 onto the gate of pass transistor 208 over conductor 202 and onto the gate of pass transistor 209 over conductor 203, allowing $(B_{POS})$ 204, and $(B_{NEG})$ 205 lines to remain at a pre-charged high state or be discharged to a low state by the flip flop (i.e., transistors 212, 213, 210, and 211). The potential on $B_{POS}$ 204 is asserted onto the source of pass transistor 208 over conductor 206, and the potential on $B_{NEG}$ 205 is asserted onto the source of pass transistor 209 over conductor 207. The drains of FET transistors 210 and 212 are connected by conductor 218 to the gate of FETs 211 and 213 and to output port 214. The drains of FET transistors 211 and 213 are connect by conductor 217 to the gate of FETs 210 and 212. Differential sensing of the state of the flip-flop is then possible. In writing data into the selected cell, $(B_{POS})$ 204 and $(B_{NEG})$ 205 are forced high or low by additional write circuitry. The side that goes to a low value is the one most effective in causing the flip-flop to change state. In the present application, one output port 214 is required to relay to circuitry in the remainder of the pixel circuit whether the data state of the SRAM is in an "on" state or an "off" state.

SRAM circuit 200 is connected to $V_{DDAR}$ by conductor 215 and to $V_{SS}$ by conductor 216. $V_{DDAR}$ denotes the $V_{DD}$ for the array. It is common practice to use lower voltage transistors for periphery circuits such as the I/O circuits and control logic of a backplane for a variety of reasons, including the reduction of EMI and the reduced circuit size that this makes possible.

The six-transistor SRAM cell is desired in CMOS type design and manufacturing since it involves the least amount of detailed circuit design and process knowledge and is the safest with respect to noise and other effects that may be hard to estimate before silicon is available. In addition, current processes are dense enough to allow large static RAM arrays. These types of storage elements are therefore desirable in the design and manufacture of liquid crystal on silicon display devices as described herein. However, other types of static RAM cells are contemplated by the present invention, such as a four transistor RAM cell using a NOR gate, as well as using dynamic RAM cells rather than static RAM cells.

The convention in looking at the outputs of an SRAM is to term the outputs as complementary signals S_pos and S_neg. The output of memory cell 200 connects the gate of transistors 213 and 211 over conductor 214 to circuitry (not shown) operative to receive the output of memory cell 200. By convention this side of the SRAM is normally referred as $S_{NEG}$. The gates of transistors 212 and 210 are normally referred to as $S_{POS}$. Either side can be used provided circuitry, such as an inverter, is added where necessary to insure the proper function of the transistor receiving the output data state of the memory cell.

Figure 1C:
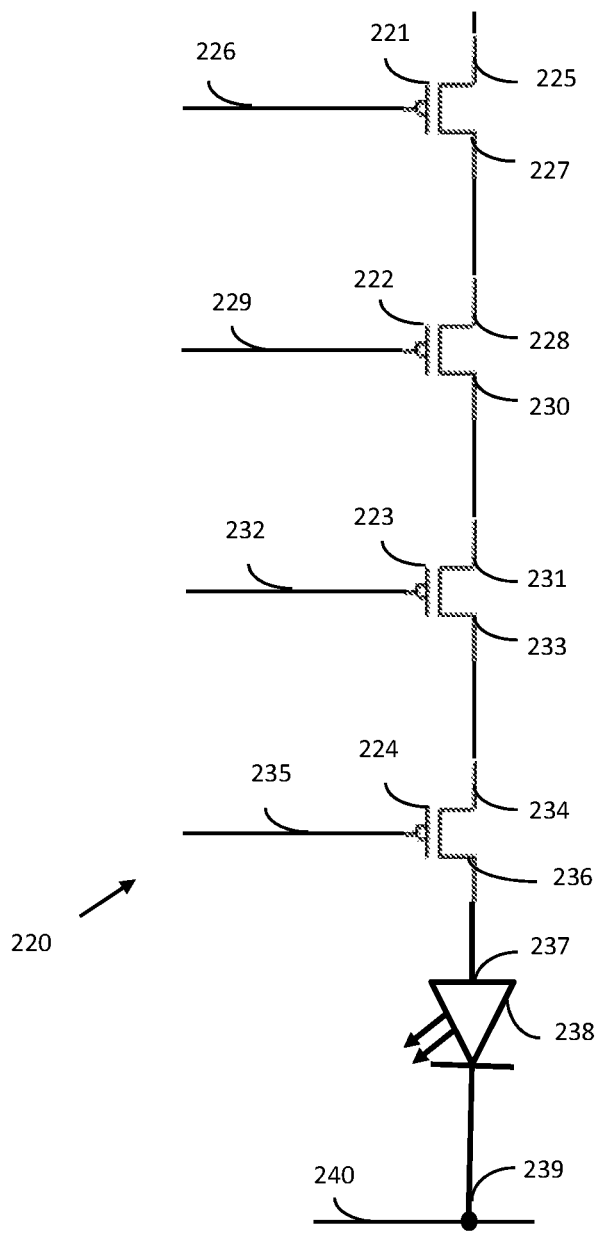
FIG. 1C is a schematic diagram of a current source drive circuit for a first embodiment of the present invention.

FIG. 1C depicts a series chain 220 of MOSFET transistors as previously noted in FIG. 1A. These transistors as a group act to provide an LED with pulse-width modulated current at the required voltage in order to create a gray-scale modulated emission from the LED of that pixel. Other emissive devices may be used instead of an LED. Transistor 221 acts a switch that is turned on or off based on the logic state of an SRAM memory cell (not shown), such as memory cell 200 of FIG. 1B. The memory state of the SRAM memory cell is asserted onto the gate of transistor 221 over conductor 226. A voltage, such as V_H asserted on conductor 276 of FIG. 4A, when asserted on source 225 of transistor 221 will be presented as V_H 276–Vdelta1 (not shown) at drain terminal 227 when the memory state of the SRAM memory cell is "on".

Transistor 222 acts as a switch that is turned on or off based on the logic state of a circuit external to the pixel cell. This switch is useful to provide means to perform additional modulation of the output of an emissive device (not shown), such as an LED. Transistor 222 is limited in function to those instances when an "on" state output of drain 227 of transistor 221 is asserted on source 228 of transistor 222. In one embodiment, a circuit (not shown) provides duty cycle modulation of the voltage applied to the gate of transistor 222 over conductor 229 to provide a measure of control of the relative intensities of the colors of a multi-color emissive SLM. In one embodiment, a circuit (not shown) provides slow duty cycle modulation of the voltage applied to the gate of transistor 222 over conductor 229 to enable display of a plane of data after the data of that plane has been loaded to memory cells of the pixels of that spatial light modulator. In one embodiment, the bit weight of the plane of data displayed on an SLM is determined by the time that the circuit asserts a voltage to emit on the gate of transistor 222. The threshold voltage of transistor 222 is VT2 (not shown). The output of transistor 222, equivalent to V_H–Vdelta1–Vdelta2, is asserted on drain 230.

Transistor 223 is a large L p-channel transistor designed to act as a voltage-controlled resistor when operated in saturation mode. The output of transistor 222 on drain 230 is asserted on source 231 of transistor 223. A bias voltage is applied over conductor 232 onto the gate of transistor 223 that effectively determines the resistance of transistor 223 and therefore the voltage drop across transistor 223. The voltage drop sets the level of the anode voltage that will be applied to an emissive device, such as LED 238. In one embodiment, the same bias voltage is applied to all pixel cells associated with the same color emissive device. In one embodiment, more than one bias voltage is required to reach the separate band gap voltages required for each of the plurality of colors on the SLM, wherein one color requires a first bias voltage and a second color requires a second bias voltage that differs from the first bias voltage.

Transistor 224 operates as part of a current source providing a fixed voltage at a variety of current levels. The voltage developed with transistor 223 onto drain 233 is asserted on source 234 of transistor 224. Rail voltage $V_{SS}$ (not shown) is asserted on the gate of transistor 224 over conductor 235. A current is asserted by drain 236 onto anode 237 of an emissive device, such as LED 238. The cathode of LED 238 is connected to V_L over conductor 240 through terminal 239.

Figure 2A:
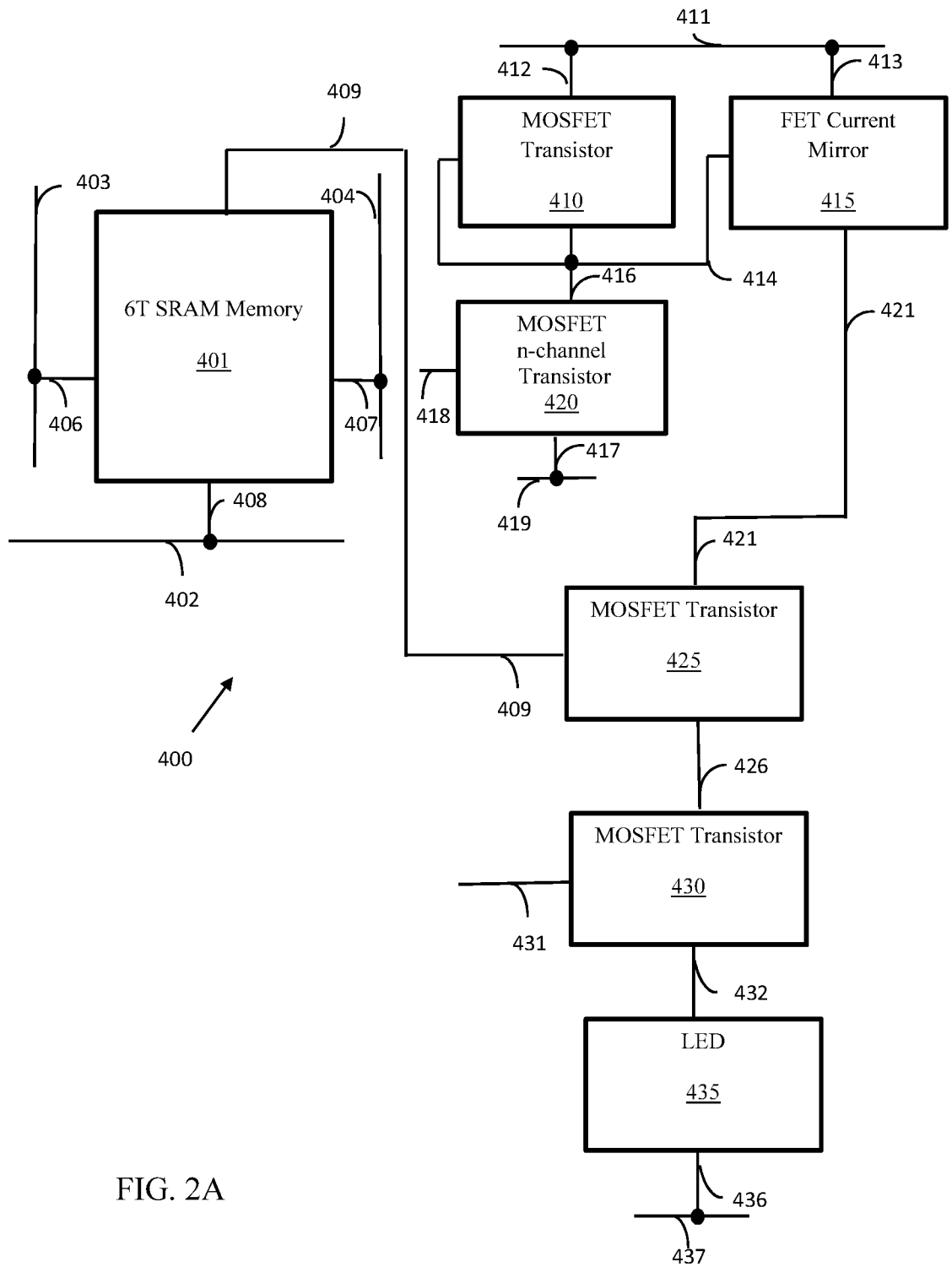
FIG. 2A is a block diagram of a current mirror backplane of an emissive display after a second embodiment of the present invention.

FIG. 2A presents a block diagram of a current mirror pixel circuit 400 of an array of pixels after the present application. The pixel circuit comprises SRAM memory cell 401, a current mirror source comprising MOSFET transistors 410, 415, and 420 and a modulation section comprising MOSFET transistors 425 and 430 operative to pulse-width modulate the output of the drain of transistor 415 to impose gray scale and color balance modulation on LED associated with that pixel. SRAM memory cell is depicted as a 6-T cell although the use of other SRAM memory cells with different numbers of transistors is anticipated.

SRAM memory cell 401 is connected to word line (WLINE) 402 by conductor 408. Conductor 408 may represent more than one connection between SRAM memory cell 401 and WLINE 402. Complementary data lines ($B_{POS}$) 403 and ($B_{NEG}$) 404 connect to SRAM memory cell 401 by conductors 406 and 407 respectively. When WLINE 402 is pulled high, pass transistors in the memory cell allow new data to be stored in the memory cell. Data output $S_{NEG}$ of the SRAM is asserted over conductor 409 onto the gate of MOSFET transistor 425. Operation of the 6T SRAM memory is explained in detail in FIG. 2B and its associated text.

MOSFET transistors 410, 415, 420, 425, and 430 form a circuit operative to deliver a pulse-width modulated drive waveform to LED 435 installed at a pixel driven by the pulse width modulated waveform at required voltage and current levels. Transistors 410 and 420 form a reference current source operative to provide a reference current to the gate of transistor 415 at a required voltage. MOSFET transistor 410 sets the reference current and MOSFET transistor 420 sets the voltage for the reference current on conductors 414 and 416. The source of transistor 415 is connected by conductor 412 to conductor 411, which is set to V_H. MOSFET transistor 420 is a very large L transistor designed to operate as a variable resister based on a bias voltage $V_{BIAS}$ applied to its gate over conductor 418. $V_{BIAS}$ is set externally and, in one embodiment, is supplied to all pixels operating with the same color LED or other emissive device. The drain of transistor 420 is connected to conductor 419 by conductor 417. Conductor 419 is connected to voltage $V_{SS}$.

MOSFET transistor 415 is operative to receive a stable reference current at its gate over conductor 414 and mirror that current. Source 413 of transistor 415 is connected to conductor 411, which supplies voltage V_H. The drain of transistor 415 asserts a stable current over conductor 421, wherein the stable current may differ from the reference current. To achieve the desired current at the drain of transistor 415, transistor 415 must be designed to deliver that. Transistor 415 is preferably a large L transistor, wherein the relationship between the length (L) and the width (W) is selected in order to achieve the desired current at its drain. The desired current asserted on the drain of transistor 415 may differ from the reference current received on the gate of transistor 415. Different W/L designs may be required for pixels of different colors.

Transistors 425 and 430 comprise a modulation section suitable to respond to pulse-width modulation waveforms used to create gray scale modulation and other pulse-width modulations implemented to perform other functions such as dimming one color of LED in order to balance the colors of the display. The need to perform these functions is well known in the art.

The output of transistor 415 over its drain is asserted onto the source of transistor 425 over conductor 421. The gate of transistor 425 is connected to the output $S_{NEG}$ of SRAM memory 401 over conductor 409. When SRAM memory 401 is in an "off" state, the voltage asserted onto the gate of transistor 425 configures that device to act as a switch in an "off" state and thereby send a voltage from its drain that is not sufficient to cause an emissive device connected to pixel circuit 400 to radiate after passing through transistor 430. When SRAM memory 401 is in an "on" state transistor 425 acts to pass the voltage asserted onto its source onto its drain reduced by the threshold voltage for transistor 425. Note that if the state of SRAM 401 is on then the voltage asserted on the gate of FET 425 is low, which is the condition required for a p-channel FET to conductor.

The output of the drain of transistor 425 is asserted onto the source of transistor 430 over conductor 426. The gate of transistor 430 is connected to a pulse-width modulated signal (L_off) generated by a controller over conductor 431. In a monochrome display all signals L_off for all pixels may be identical. For a multicolor display, each color may have a separate L_off. The purpose of L_off is to enable color balancing of the colors of a multicolor display. In a monochrome display it is used control the overall intensity of the display. Other uses for L_off are explained in the present application.

The output of the drain of transistor 430 is asserted onto conductor 432. The output comprises a pulse width modulated signal operative to create a gray scale modulation at a desired intensity. The output is connected over conductor 432 to the anode of an emissive device such as LED 435. The cathode of LED 35 is connected by terminal 436 to V_L asserted onto conductor 437. The voltage level of V_L is lower than V_H, and may be lower than $V_{SS}$ and may be a negative voltage, all as previously noted for FIG. 1C.

In order to avoid aliasing caused by the operating rate of L_off may create pulse intervals that are shorter than the shortest pulse duration imposed on $S_{NEG}$ by a substantial margin, perhaps a factor of 10 to 1 in order to avoid aliasing. In one embodiment operation of L_off is synchronized with operation of $S_{NEG}$.

Figure 2B:
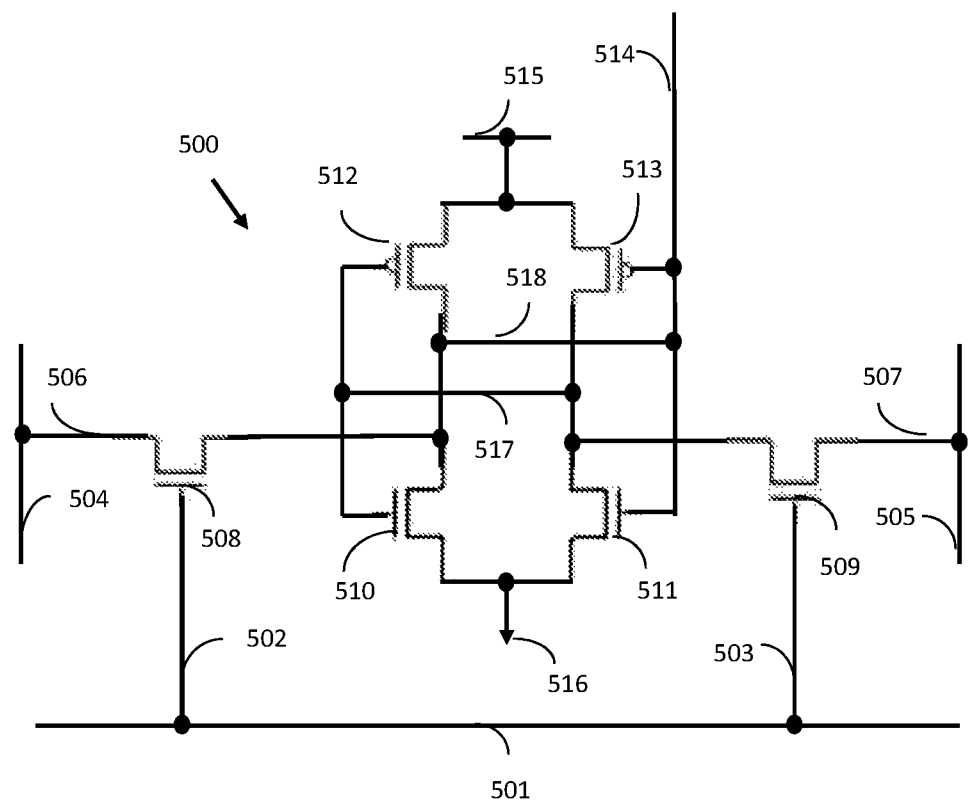
FIG. 2B is a schematic diagram of a 6-transistor static RAM memory for a second embodiment of the present invention.

FIG. 2B shows a preferred embodiment of a storage element, similar in most respects to the SRAM storage element of FIG. 1B. The storage element is preferably a CMOS static ram (SRAM) latch device, depicted as SRAM circuit 500. Such devices are well known in the art. See DeWitt U. Ong, Modern MOS Technology, Processes, Devices, & Design, 1984, Chapter 9 5, the details of which are hereby fully incorporated by reference into the present application. A static RAM is one in which the data is retained as long as power is applied, though no clocks are running FIG. 2B shows the most common implementation of an SRAM cell in which six transistors are used. MOSFET transistors 508, 509, 510, and 511 are n-channel transistors, while MOSFET transistors 512, and 513 are p-channel transistors. In this particular design, word line 501, when pulled high, turns on n-channel pass transistors 508 and 509, allowing ($B_{POS}$), asserted on conductor 504 and thereby onto the source of n-channel FET 508 over conductor 506, and ($B_{NEG}$), asserted on conductor 505 and thereby onto the source of n-channel FET 509 over conductor 507, to remain at a pre-charged high state or be discharged to a low state by the flip flop (i.e., transistors 512, 513, 510, and 511). The drain of p-channel FET 512 and the drain of n-channel FET 510 are linked to the gate of p-channel FET 513 and the gate of n-channel FET by conductor 518. In like manner, the drain of p-channel FET 513 and the drain of n-channel FET 511 are linked to the gate of p-channel FET 512 and the gate of n-channel FET 510 by conductor 517. Differential sensing of the state of the flip-flop is then possible. In writing data into the selected cell, ($B_{POS}$) 504 and ($B_{NEG}$) 505 are forced high or low by additional write circuitry. The side that goes to a low value is the one most effective in causing the flip-flop to change state. In the present application, one output port 514 ($S_{NEG}$) is required to relay to circuitry in the remainder of the pixel circuit that the SRAM is in an "on" state or an "off" state. The comments for FIG. 1B regarding $S_{POS}$ and $S_{NEG}$ should be applied when reading this application SRAM circuit 500 is connected to $V_{DDAR}$ at conductor 515 and to $V_{SS}$ at conductor 516. $V_{DDAR}$ denotes the $V_{DD}$ for the array. It is common practice to use lower voltage transistors for periphery circuits such as the I/O circuits and control logic of a backplane for a variety of reasons, including the reduction of EMI and the reduced circuit size that this makes possible.

The six-transistor SRAM cell is desired in CMOS type design and manufacturing since it involves the least amount of detailed circuit design and process knowledge and is the safest with respect to noise and other effects that may be hard to estimate before silicon is available. In addition, current processes are dense enough to allow large static RAM arrays. These types of storage elements are therefore desirable in the design and manufacture of liquid crystal on silicon display devices as described herein. However, other types of static RAM cells are contemplated by the present invention, such as a four transistor RAM cell using a NOR gate, as well as using dynamic RAM cells rather than static RAM cells.

Figure 2C:
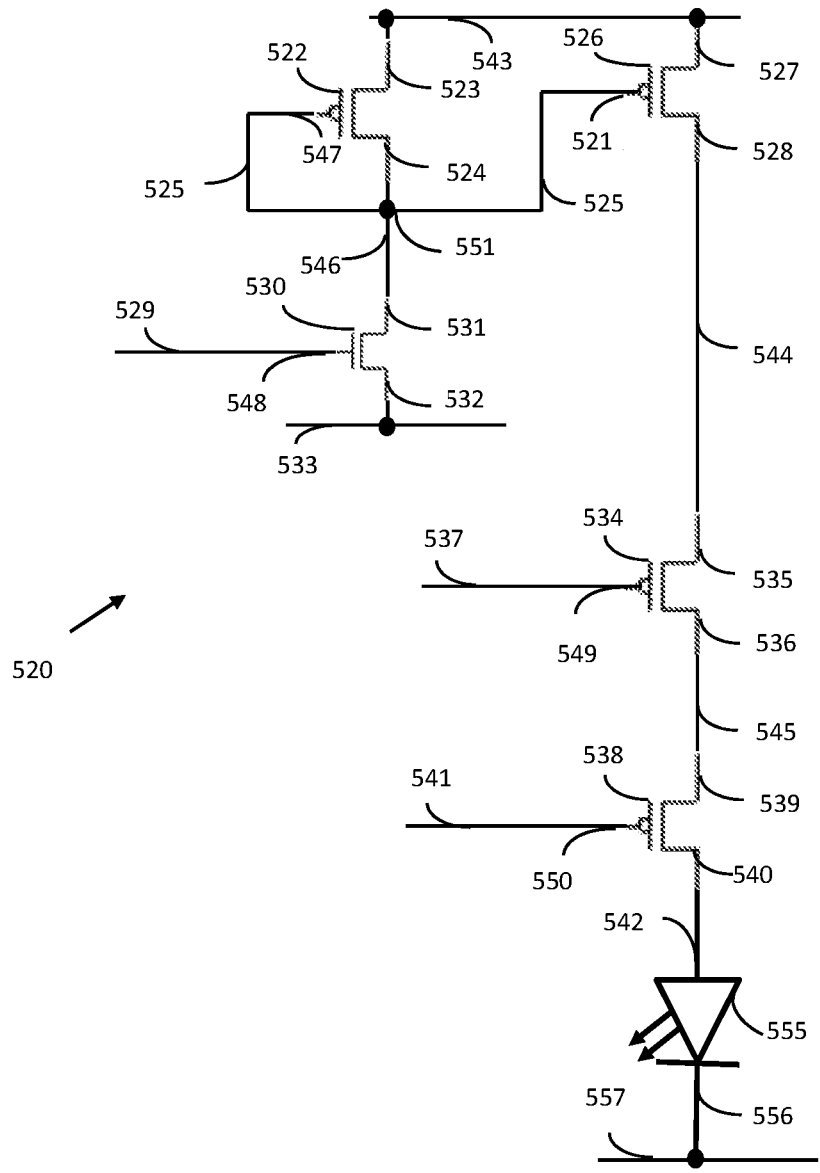
FIG. 2C is a schematic diagram of a current mirror drive circuit for a second embodiment of the present invention.

FIG. 2C presents a schematic drawing of a current mirror circuit implementation 520 as presented in the block diagram of FIG. 2A. P-channel transistor 522 and p-channel transistor 526 together form a current source/current mirror unit suitable to provide an unmodulated current to a modulating circuit at a voltage set by the voltage applied to the gate of large L n-channel transistor 530.

Source 523 of transistor 522 is connected to voltage V_H (not shown) on conductor 543, wherein V_H is an external global voltage that is separate from other external global voltages such as $V_{DDAR}$ and $V_{SS}$. Transistor 522 is operated in diode mode wherein gate 547 and drain 524 are connected by electrical connections (conductors) 525 and conductor 546. Gate 547 and drain 524 of transistor 522 are connected to gate 521 of transistor 526. Conductor 525 and conductor 546 are electrically connected at connection point 551. Transistor 522 sets reference current $V_{REF}$ for the current mirror circuit.

N-channel transistor 530 is a large L MOSFET transistor that acts as a variable resistor when operated in saturation. Drain 531 of FET 530 is connected to gate 547 and drain 524 of FET 522, all of which are connected to gate 521 of FET 526 by conductors 546 and 525. Source 532 of large L n-channel transistor 530 is connected to $V_{SS}$ over conductor 533. Gate 548 of transistor 530 is connected to bias voltage $V_{BIAS}$ over conductor 529. Pixels with different color LEDs may have different $V_{BIAS}$ requirements so a plurality of different $V_{BIAS}$ voltages applied over independent circuits is conceived. Together transistor 522 and transistor 530 deliver a stable reference current at a fixed voltage to gate 521 of transistor 526. The fixed voltage is determined by voltage $V_{BIAS}$ asserted on gate 548 of transistor 530.

Source 527 of transistor 526 is connected to conductor 543 which supplies voltage V_H. This places source 523 of transistor 522 and source 527 of transistor 526 at the same potential and electrically connected through conductor 543. Drain 528 of transistor 526 delivers a required voltage and current. The voltage and current output of drain 528 is delivered to source 535 of transistor 534 over conductor 544.

As is well known in the art, transistor 526 may be designed to deliver a stable current over drain 528 that is greater or lower than the reference current delivered to gate 521 of transistor 526. Because current mirror transistors 522 and 530 are unaffected by the data state of the associated memory device (not shown), in one embodiment the output of the reference current mirror of one pixel may act as current mirror for a nearby pixel provided the voltage of the reference current is also compatible with the LED on the nearby pixel. Because of the aforementioned statement regarding transistor 526, it is clear that different currents may be derived from a single reference current. The nearby pixel sharing a current mirror may therefore receive a different current and have an associated LED of a different color type provided a compatible voltage is delivered. A mechanism for creating different current outputs is a change to the W/L aspect ratio of transistor 526. The voltage presented on drain 528 of transistor 526 is V_H−Vdelta5 where Vdelta5 is the difference between the voltage on source 527 of transistor 526 and voltage on drain 528 of transistor 526 resulting from any residual resistance within transistor 526.

Transistors 534 and 538 form a modulation section. Transistor 534 is turned on or off in response to the data state stored in a memory cell such as memory cell 500 of FIG. 2B. Transistor 538 may be turned "on" or "off" by a number of different modulation requirements. In one embodiment, a relatively high frequency rectangular waveform of varying duty cycle may be used to lower the apparent intensity of an LED. In another embodiment, a waveform is imposed on transistor 538 that serves to cause on state LEDs to emit light for a time equivalent to a desired modulation duration. Other modulations are envisioned. Light is emitted by the LED only when transistor 534 and transistor 538 are both in an "on" state.

Transistor 534 turns on when on state data stored in a memory device such as memory device 500 of FIG. 2B causes a low voltage to be applied to gate 549 of p-channel transistor 534 over conductor 537, thereby causing transistor 534 to assert an output onto drain 536. The output (voltage and current) of transistor 534 is asserted by drain 536 onto conductor 545 that connects to source 539 of transistor 538. The external drive waveforms (not shown) are asserted onto gate 550 of transistor 538 over conductor 541. The voltage is V_H−Vdelta5−Vdelta6, where Vdelta6 is the voltage difference between the source and drain of transistor 534 due to residual resistance.

The output (voltage and current) of transistor 538 onto drain 540 is connected to conductor 542. The output comprises pulse-width modulated current and voltage, suitable to be applied to the anode of LED 555. The cathode of LED 555 is connected to voltage supply V_L over conductor 556 that connects to conductor 557 set to V_L, wherein V_L is lower than V_H and may be lower than $V_{SS}$ or may be a negative voltage. The level of V_L is selected so that the difference between the voltage asserted on the anode of LED 555 and the voltage asserted on the cathode of LED 555 is sufficient to cause LED 555 to discharge when circuit 520 is an on state.

Figure 3:
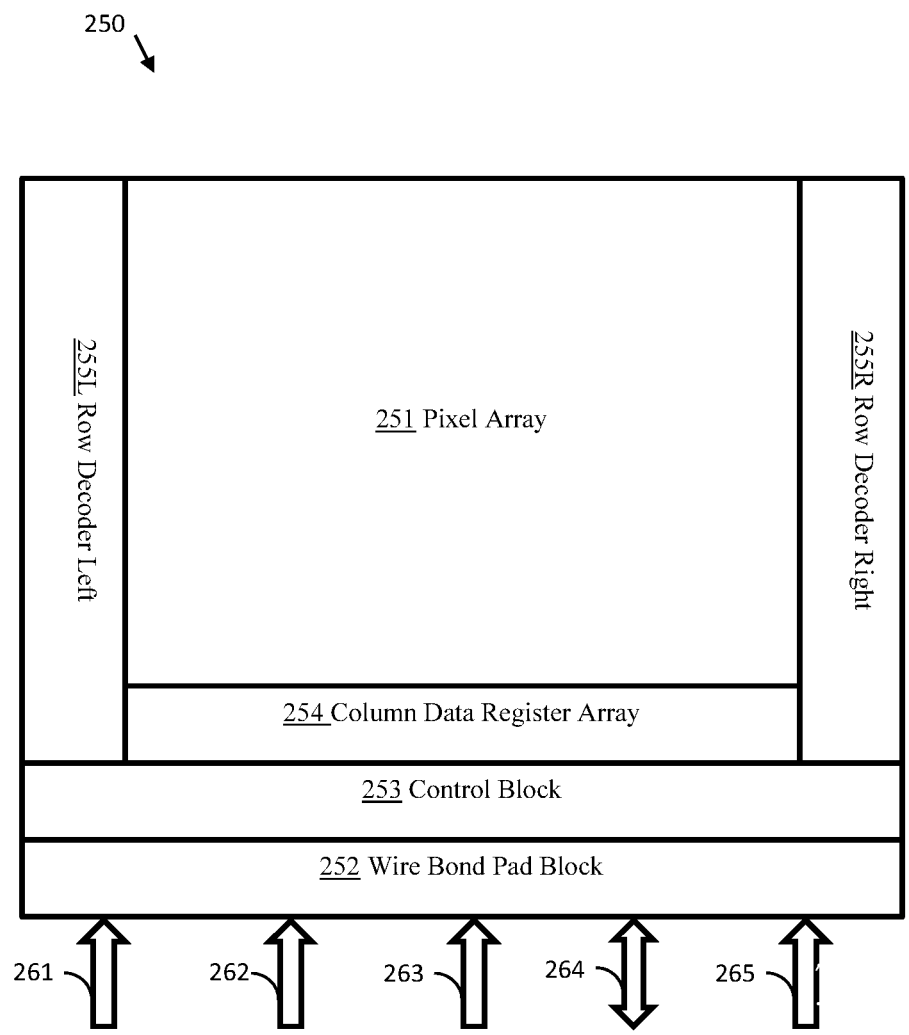
FIG. 3 is a block diagram layout for a backplane of an emissive display of the present invention.

FIG. 3 presents a functional diagram of the data transfer sections of spatial light modulator (SLM) 250. SLM 250 comprises pixel array 251, left row decoder 255L, right row decoder 255R, column data register array 254, control block 253, and wire bond pad block 252. Wire bond pad block 252 is configured to enable contact with an FPCA or other suitable connecting means so as to receive data and control signals over lines from an SLM controller such as that of FIG. 4A. The data and control signal lines comprise compromise clock signal line 261, op code signal lines 262, serial input-output signal lines 263, bidirectional temperature signal lines 264, and parallel data signal lines 265.

Wire bond pad block 252 receives image data and control signals and moves these signals to control block 253. Control block 253 receives the image data and routes the image data to column data register array 254. Row address information is routed to row decoder left 255L and to row decoder right 255R. In one embodiment, the value of Op Code line 262 determines whether data received on parallel data signal lines 265 is address information indicating the row to which data is to be loaded or data to be loaded to a row. In one embodiment the row address information acts as header, appearing first in a time ordered sequence, to be followed by data for that row. In the context of the present application, the word "address" is most often a noun used to convey the location of the row to be written. The location may be conveyed as an offset from the location (address) of a baseline row or it may be an absolute location of the row to be written. This is similar to the manner in which a Random-Access Memory device, such as an SRAM, is written or read. The use of column addressing, also used in Random-Access Memory devices, may be envisioned, but other mechanisms, such as a shift register, are also envisioned. Use of a shift register to enable the writing of data to rows of the array is also envisioned.

Row decoder left 255L and row decoder right 255R are configured so as to pull the word line for the decoded row high so that data for that row may be transferred from column data register array 254 to the storage elements resident in the pixel cells of that row of pixel array 251. In one embodiment, row decoder left 255L pulls the word line high for a left half of the display, and row decoder right 255R pulls the word line high for a right half of the display. In one embodiment, only one row decoder is used for each row without the left half and right half distinction. Half a row may be only an approximation and not exactly half.

Figure 4A:
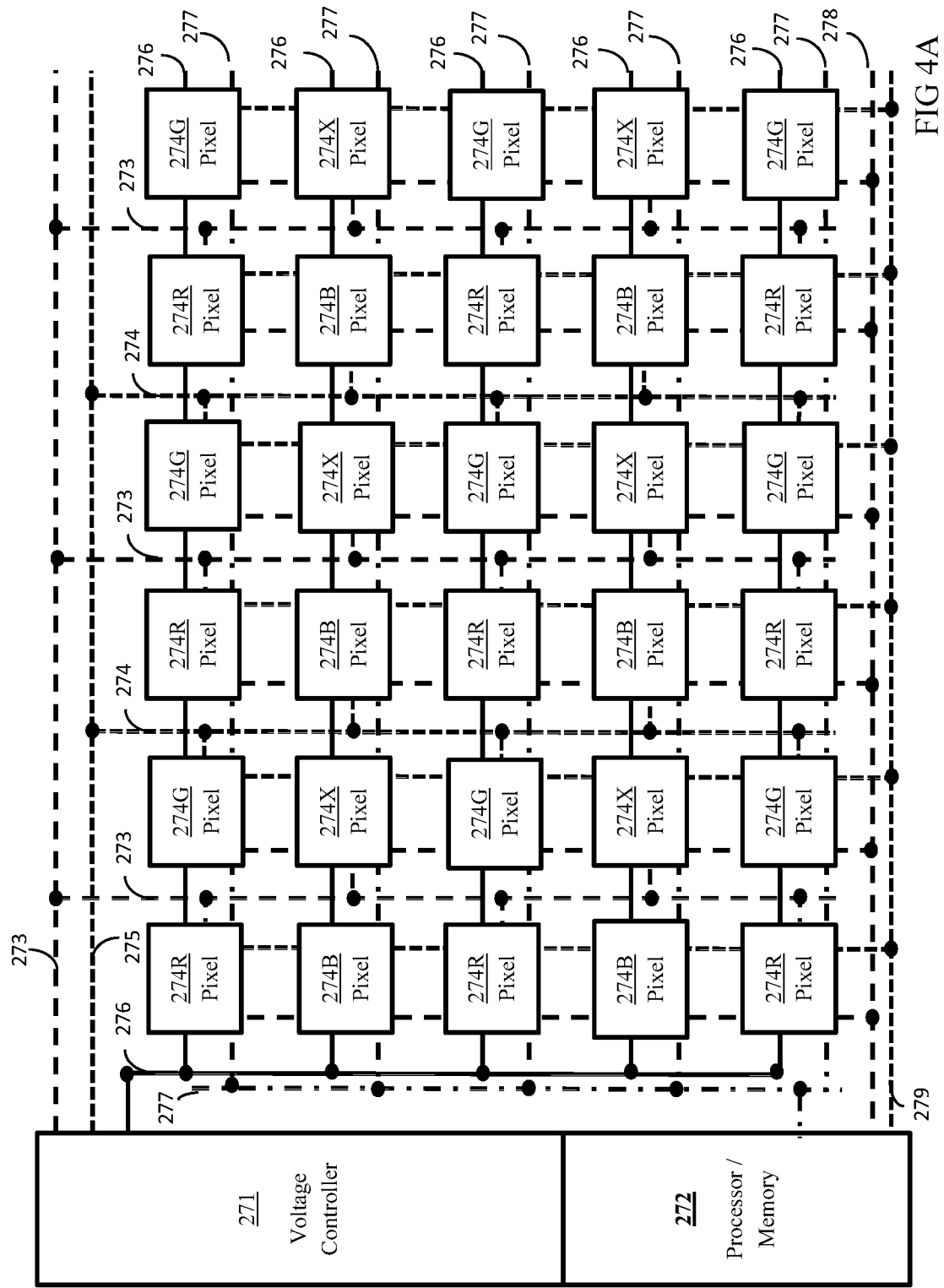
FIG. 4A is a block diagram of an array of pixels and a controller for an array of pixels of the present invention.

FIG. 4A presents a simplified view of a controller and backplane relationship. A SLM controller comprises voltage controller 271 and processor/memory 272. Voltage controller 271 provides a variety of fixed voltages to an array of pixels on a backplane. The array of pixels comprises a plurality of pixel circuits termed 274R, 274B, 274G, and 274X. Pixel circuits 274R, 274B and 274G represent red, blue and green pixels in a full color display. Pixel circuit 274X represents a pixel that may be allocated, normally during the design process, to any color where required or to a white LED or to a yellow LED, or to another color as needed. Often the relative efficiencies of the colors of a multi-color display are not equally efficient, thus allowing for the addition of an additional LED for a color where performance is low is a positive benefit.

The fixed voltages of FIG. 4A comprise voltage V_H delivered over conductor 276, Vbias_rx delivered over conductor 273, and Vbias_gb delivered over conductor 275. Global voltages $V_{DDAR}$ and $V_{SS}$ are not shown as they are not always controlled by voltage controller 271. In some embodiments, global voltages $V_{DDAR}$ and $V_{SS}$ may be controlled by a similar voltage controller. V_H on conductor 276 is supplied to each pixel circuit of the array of pixels regardless of the color associated with that pixel. It differs from $V_{DDAR}$ in that it is selected with a view of the totality of the design in view of the need to provide operating voltage to a variety of pixel circuits used to drive emissive devices with a plurality of band gap materials and therefore requiring different operating voltages. Use of a single global drive voltage such as V_H delivered on conductor 276 may require that those pixel circuits be configured to modify V_H delivered on conductor 276 differently for LEDs of a different color to achieve those different operating voltages. In one embodiment, V_H 276 is provided by a precision digital-to-analog converter.

Voltage Vbias_rx delivered over conductor 273 and Vbias_gb delivered over conductor 275 are bias voltages supplied to MOSFET transistors acting as voltage-controlled resistors (such as transistor 223 of FIG. 3) in order to achieve a desired voltage drop. In this application, Vbias_rx is supplied to red and "x" pixel circuits, wherein, in one embodiment, the "x" circuit is allocated to red to improve over a deficiency in the output of the red channel. Vbias_gb is supplied to both green and blue pixel circuits. Any needed differences in the output of MOSFET transistors acting as voltage-controlled resistors can be accommodated in design.

A separate voltage V_L is distributed to the cathode of each LED in a manner (not shown) similar to the distribution of V_H over conductor 276. Alternatively, it may be supplied through external means, such as an ITO coated cover glass placed over the top of each LED (not shown.) The level of V_L is selected so that the voltage difference between the voltage asserted on the anode of each LED and V_L is sufficient to cause the LED to discharge light when in an on state.

Logic circuit/wordline 277 delivers row select logic to select the row to which data is to be transferred and causes the wordline for that row to go high. This logic works on an addressable row basis as previously noted. Data is presented to the column drivers of each column on buss 278, wherein the data is appropriate for the row to be selected by logic circuit/wordline 277.

Logic circuit element 279 provides the control signal previously noted for an external circuit to provide such things as duty cycle dimming, on/off control and so forth.

Figure 4B:
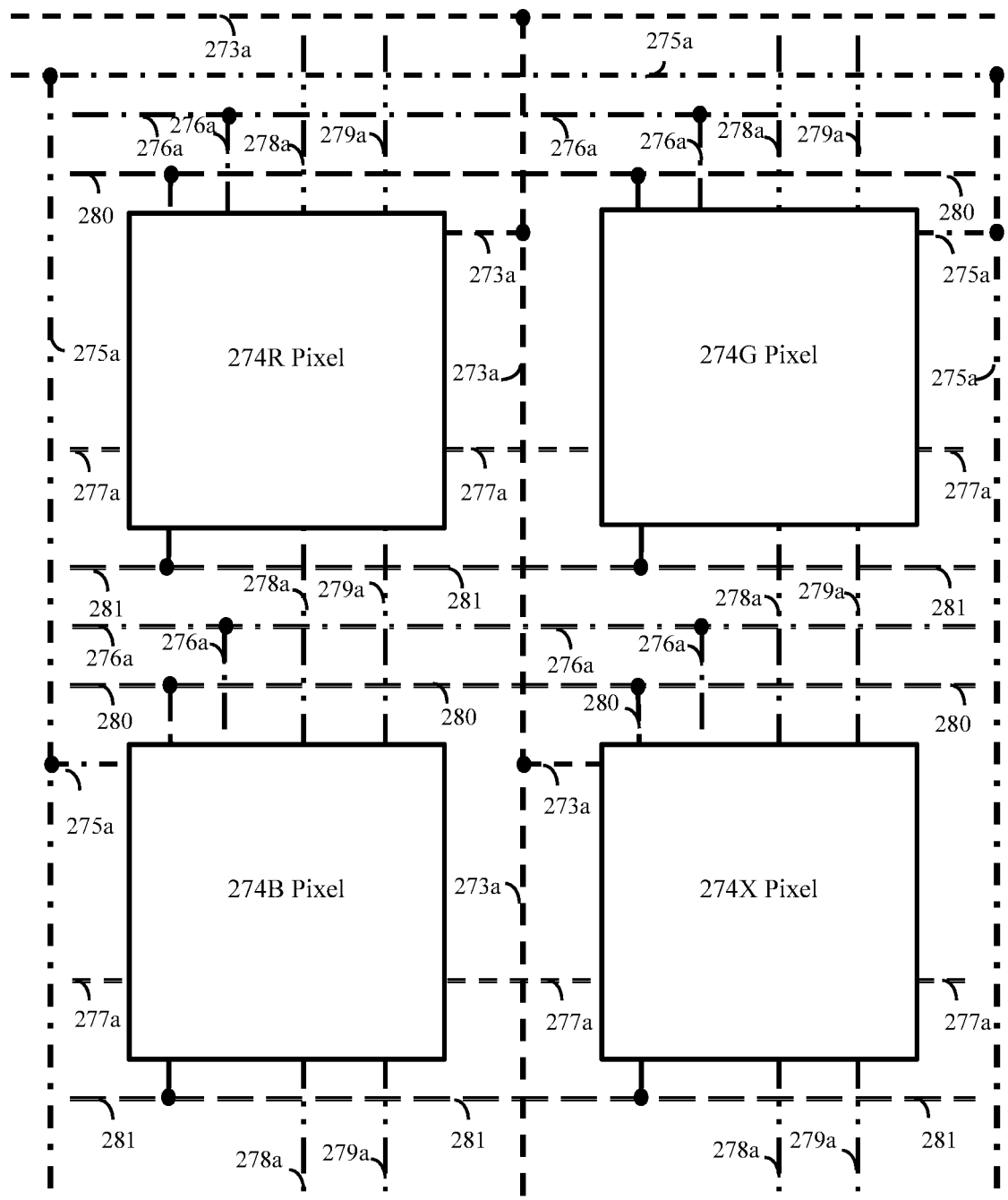
FIG. 4B is a block diagram of 4 pixels of an array of pixels wherein each pixel represents a specific emissive configuration.

FIG. 4B presents further detail of one set of four pixels comprising red pixel 274R, green pixel 274G, blue pixel 274B and pixel 274X, which may be allocated to an individual color as needed. The individual circuit elements are as described for circuit elements of the same number without the attached letters regarding FIG. 4A except as that $V_{DDAR}$ and $V_{SS}$ rail voltage supplies 280 and 281 respectively are shown. Conductor 273a represents a segment of conductor 273 of FIG. 4A operative to deliver Vbias_rx to all red pixels 274R and all x pixels 274X. Conductor 275a represents a segment of conductor 275 of FIG. 4A operative to deliver Vbias_gb to all green pixels 274G and all blue pixels 274B. Conductor 276a represents a segment of conductor 276 of FIG. 4A operative to deliver a voltage V_H to all pixels of the array of pixels. Conductor 277a represents a segment of a wordline that forms a part of the wordline of logic circuit/wordline 277 of FIG. 4A wherein the wordline of the selected row is held high when data is to be written to that row. Conductor 278a represents a segment of buss 278 of FIG. 4A operative to deliver complementary data to the pixels of the selected row. Conductor 279a represents a segment of conductor 279 of FIG. 4A operative to deliver a signal to the pixels of an array to introduce a dimming function based on pulse width modulation. In one embodiment pixels of the same color of the array receive a dimming signal that is different from the dimming signals delivered to pixels of a different color.

It is important to note that the circuitry of an integrated circuit, such as the backplane of the present application, is enormously complex. It is always possible to develop a 2-D representation but these are fundamentally 3-D devices. Electrical connections occur across a number of levels using a variety of conductive materials. The drawings of circuits are suggestive of an actual layout but a choice of a different depiction of similar circuits should not be considered as representing some fundamental difference.

The backplane of the present application facilitates operation of an emissive display in several different modes. The backplane uses means for delivering binary modulation data to the memory cell of a pixel of an emissive display using techniques resembling that used by an SRAM. Applicant calls attention to the data sheet for Intel SRAM 2114A, wherein both row and column addressing are enabled. The circuit implementation for addressing data to the memory cell of the pixels of the backplane resembles that described in U.S. patent application Ser. No. 10/329,645, now U.S. Pat. No. 7,468,717, "Method and Device for Driving Liquid Crystal on Silicon Display Systems", Hudson, and in U.S. patent application Ser. No. 10/413,649, now U.S. Pat. No. 7,443,374, "Pixel Cell Design with Enhanced Voltage Control", Hudson, both of which are assigned to the owner of the present application. In one embodiment of the present application, Applicant discloses a backplane wherein data is sent to pixels of a row selected by addressing means. In one embodiment, the means for addressing pixels of a row with data is based on the random-access row addressing means common to both DRAM and SRAM memory devices. In this embodiment, each row of pixels possesses a unique address configuration wherein the backplane comprises means for decoding the unique address of a row and means for delivering data for that row to the memory devices forming a part of each pixel circuit of that row. In one embodiment said rows are not addressed in sequential order. In one embodiment, Applicant discloses a backplane wherein data is sent to a set of pixels of a row selected by addressing means. The contents of both patents and of the data sheeting for Intel SRAM 2114A are incorporated herein by reference.

Applicant owns patents for several different modulation methods applicable to digital display systems, such as the present invention. These comprise application Ser. No. 13/790,120, now U.S. Pat. No. 9,583,031, "Modulation Scheme for Driving Digital Display Systems," Hudson et al, U.S. patent application Ser. No. 10/435,427, now U.S. Pat. No. 8,421,828, "Modulation Scheme for Driving Digital Display Systems," Hudson et al, and U.S. patent application Ser. No. 15/408,869, now U.S. Pat. No. 9,406,269, "System and Method for Pulse Width Modulating a Scrolling Color Display", Lo et al, U.S. patent application Ser. No. 14/200,116, now U.S. Pat. No. 9,406,269, "Gray Scale Drive Sequences for Pulse Width Modulated Displays," Lo et al, U.S. patent application Ser. No. 11/740,238, now U.S. Pat. No. 8,111,271, and U.S. patent application Ser. No. 13/340,100, now U.S. Pat. No. 8,264,507, both "Multi-Mode Pulse Width Modulated Displays," Hudson et al, U.S. patent application Ser. No. 11/740,238, now U.S. Pat. No. 7,852,307, "Multi-Mode Pulse Width Modulated Displays," Hudson, and U.S. patent application Ser. No. 14/712,061, now U.S. Pat. No. 9,918,053, "System and Method for Pulse-Width Modulating a Phase-Only Spatial Light Modulator", Lo, et al. Each of these comprises modulation of a row-addressable spatial light modulator wherein all pixels of an addressed row are written with data. Each of the named patents is incorporated herein by reference.

U.S. patent application Ser. No. 09/032,174, now U.S. Pat. No. 6,151,011, presently assigned to Omnivision Technologies, Inc., titled "System and Method for Using Compound Data Words to Reduce the Data Phase Difference between Adjacent Pixel Electrodes" (hereafter Worley) describes a method of arranging binary data into nonbinary thermometer bits representing larger aggregates of bits that are of uniform weighting while retaining binary weighted lower bits in order to reduce the occurrences of data phase errors across a display. This reduces specific problems with the use of binary weighted modulation wherein certain adjacent gray levels are represented by modulation segments that have no temporal overlap, resulting in a perceived artifact in images moving across a display and also establishing strong lateral field in a liquid crystal display that exists during a significant part of or all of a modulation period. A result of using the method of Worley is to reduce the occurrences of dynamic false contour on emissive displays. Images generated by emissive displays are not prone to lateral field image defects that motivated the invention of Worley in the context of liquid crystal devices. The problem of dynamic false contours in the context of emissive displays, such as plasma display panels, is well known in the art and has been the subject of much work and numerous patents and technical papers. Applicant presents use of a technique similar to Worley with improvements, including the use of thermometer bits of varying durations in order to more closely match a desired gamma curve and temporal dispersal of thermometer bits as they are added to reduce the appearance of flicker, another objectional artifact, within the display of a sequence corresponding to a gray level. The use of dispersed thermometer bits of varying durations is attested to in the preceding cited patents and patent applications. The method of arranging data disclosed in Worley is not limited to row addressable spatial light modulators. The contents of this patent are incorporated herein by reference.

In U.S. patent application Ser. No. 08/721,862, now U.S. Pat. No. 6,201,521, assigned to Texas Instruments Incorporated, "Divided Reset for Addressing Spatial Light Modulator," Doherty (hereafter Doherty), the application discloses means for modulating a binary spatial light modulator wherein the rows of an array of pixels are divided into subgroups of rows, each subgroup being configured to allow each pixel on all rows of the subgroup to be turned on or off as a set. The pixel control circuitry of the present application operates differently from that of Doherty. The contents of this patent are incorporated herein by reference.

In one embodiment, the display of the present application may be modulated in a global manner by loading a plane of data to each pixel of the rows of an array of pixels, and then using circuitry to enable each pixel set to an on state to emit light for a period of time corresponding to a desired gray level. For example. logic signal L_off, asserted on 229 of FIG. 1C, may be used to turn all 'on state" LEDs on and off.

Applicant herein discloses a layout of multi-colored pixel elements which together form a group comprising, in one embodiment, red, green and blue pixels that correspond to white light when all are turned on together, and wherein at least one of the multi-colored pixels is located on a different row to the other multi-colored pixels. Knowledge of the human factors component of displays will lead to the understanding that the multi-colored pixel elements should be operated as close in time to one another as feasible. This in turn requires a modification to the previously disclosed modulation methods in order to satisfy this desirable characteristic. FIG. 5 depicts a modulation sequence for the present invention. The vertical axis of the table represents rows of an array of pixels number 1 through 12 and the horizontal axis represents a series of time slots indicating which row of pixels is written by a write pointer. Write pointers Ax–Fx represent a pattern of write pointers applied to the rows of an array of pixels, wherein the x is replaced by a numeral that indicates which application of the pattern of write pointers is represented.

FIG. 5 presents the application of three patterns of three write pointers, the first application being A1-F1 during time slots 1-6, the second application being A2-F2 during time slots 7-12, and the third application being A3-F3 during time slots 13-18. Rows 1-12 are organized such that row 1 and row 2 have differing multi-colored pixel elements thereon and such that the combination of the multi-color pixel elements of row 1 and row 2 provide the full range of desired colors, and should be operated as close in time to one another as feasible. Rows 3 and 4, rows 5 and 6, rows 7 and 8, rows 9 and 10 and rows 11 and 12 repeat the same color arrangements as rows 1 and 2 and should also be operated as close in time to one another as feasible. Stated otherwise, rows 1, 3, 5, 7, 9 and 1 are configured in a first color configuration and rows 2, 4, 6, 8, 10 and 12 are configured in a second color configuration. Write pointers Ax, Cx, and Ex each direct data to rows in the same color configuration as row 1 while write pointers Bx, Dx and Fx each direct data to rows in the same color configuration as row 2.

The application of the pattern of row write pointers must move by two rows or by a multiple of two rows to ensure that a write pointer only modulates rows of identical color configurations. Observing these constraints enables the two adjacent rows to be written as close to one another in time as possible while also allowing the use of selecting a row spacing to determine the time after a row is written by a first write point until it is written again by a second write pointer. The spacing between Ax and Cx is two rows and the spacing between Cx and Ex is 4 rows and the spacing between Bx and Dx is two rows and the spacing between Dx and Fx is four rows.

Referring to FIG. 5, two examples illustrate the result. Row 3 is first written to by write pointer C1 in time slot 3 and is next written to by write pointer A2 in time slot 7. In like manner row 4 is first written to by write pointer D1 in time slot 4 and is next written to by write pointer B2 in time slot 8. Rows 3 and 4 are written close together in time and are each modulated for 4 time slots before they are subsequently written by other write pointers. Row 7 is first written to by write pointer E1 at time slot and is subsequently written to by write pointer C3 at time slot 15, while row 8 is first written to by write pointer F1 at time slot 6 and is subsequently written to by write pointer D3 at time slot 16, thus modulating each row for 10 time slots. This illustrates the point and demonstrates that the conditions set up above can be met with this type of modulation scheme.

Figure 6A:
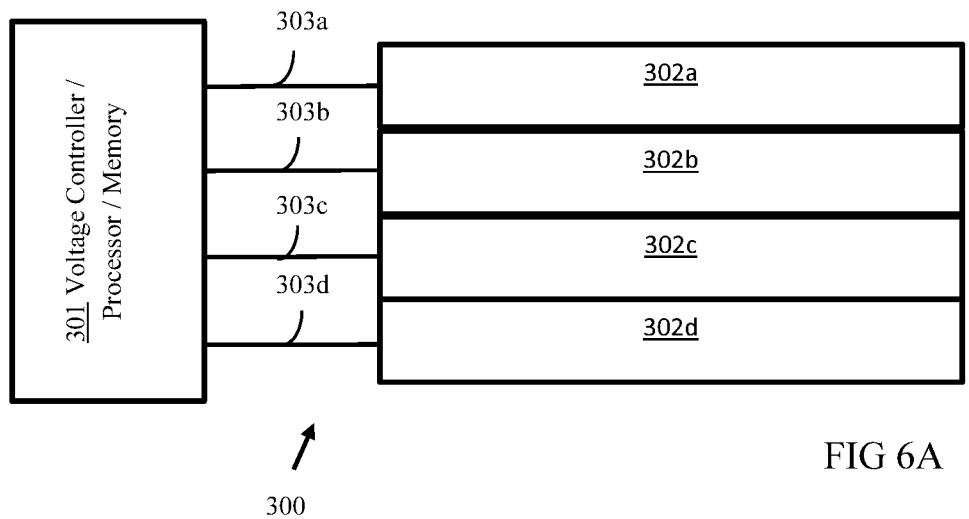
FIG. 6A is a block diagram of an emissive display wherein banks comprising a plurality of rows may be separately switched on and off.
Figure 6B:
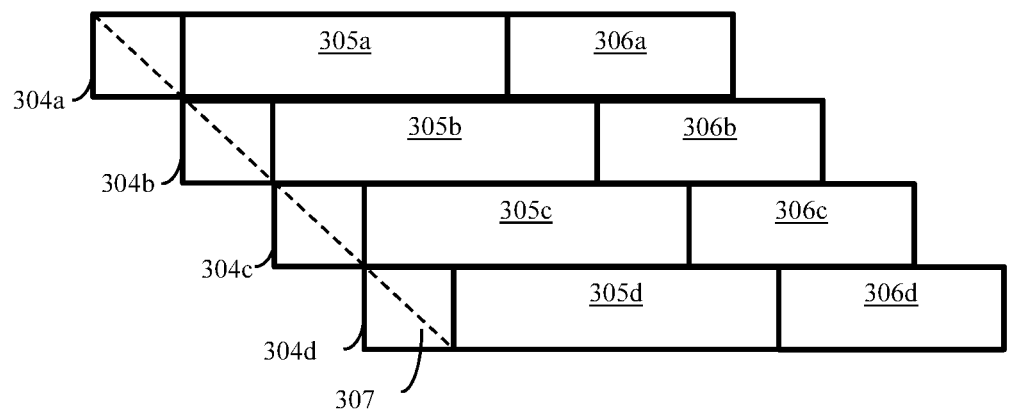
FIG. 6B presents a modulation sequence for the emissive display of FIG. 6A.

FIGS. 6A and 6B present a staggered modulation method suitable for use with an emissive array of pixels after the present invention. In FIG. 6A, display system 300 comprises voltage controller/processor/memory 301, Array electrical connections 302a, 302b, 302c and 302d are each configured to deliver a common fixed voltage to the cathode of a plurality of rows of emissive pixel elements. A fixed mode voltage is supplied separately to each of array electrical connections 302a, 302b, 302c and 302d over conductors 303a, 303b, 303c and 303d respectively, wherein voltage supplied to each electrical connection 302a, 302b, 302c and 302d may be operated in a manner temporally independent of all other electrical connections.

FIG. 6B depicts one manner in which the display system of FIG. 6A may be operated. The horizontal axis represents time left to right while the vertical axis represents groups of rows. Row write action 307 represents a continuous writing of data from the top to the bottom of the display The upper horizontal sequence comprises data load interval 304a, data display radiate interval 305a, and data display off interval 306a. During data load interval 304a, array electrical connection 302a is not in an on state so the array of emissive pixels in the rows connected to electrical connection 302a do not radiate. The end of data write interval 304a is depicted as occurring when the last row of the array of rows of pixels is written with data although with experience in the art will appreciate that the start of data display radiate 305a may be delayed from that time. During data display radiate interval 305a, electrical connection 302a is placed in an on state so that the array of emissive pixels on the rows connected to electrical connection 302a do radiate. At the end of data display radiate interval 305a, electrical connection 302a is returned to an off state so that the array of emissive pixels on the rows connected to electrical connection 302a no longer radiate and data display off interval 306a begins. Data display off interval 306a lasts until the next data load interval (not shown) begins. The duration of data display radiate interval 305a may be determined according to any of the previously presented concepts regarding gray levels. It should be noted that the duration of 305a is controlled within voltage controller/processor/memory 301.

When data display radiate interval 305a begins, data is written to a second horizontal sequence comprising data load interval 304b, data display radiate interval 305b, and data display off interval 306b. Data load interval 304b comprises a continuation of row write action 307. At the end of data load interval 304b, data display radiate interval 305b may begin immediately or after a delay. The duration of data display radiate interval 305b is controlled by voltage controller/processor/memory 301. In one embodiment, data display radiate intervals 305a and 305b are substantially equal. In one embodiment data display radiate intervals 305a and 305b are not substantially equal. At the end of data display radiate interval 305b, data display off interval 306b begins.

The operation of intervals 304c, 305c and 306c and of intervals 304d, 305d and 306d operate as previously noted for interval 304a, 305a and 306a and interval 304b, 305b and 306b with all the same considerations previously noted.

One advantage of the staggered modulation method of FIGS. 6A and 6B is that keeps some information on the display while avoiding the long delay needed if the entire array was required to be written before any data could be displayed. It provides an alternative for the display of short duration pulses.

All figures in the present application descriptive of n-well and CMOS integrated circuit implementations are assumed to include all normal aspects of a CMOS design such as the use of gate oxide between the gate and the underlying well or substrate.

Figure 7A:
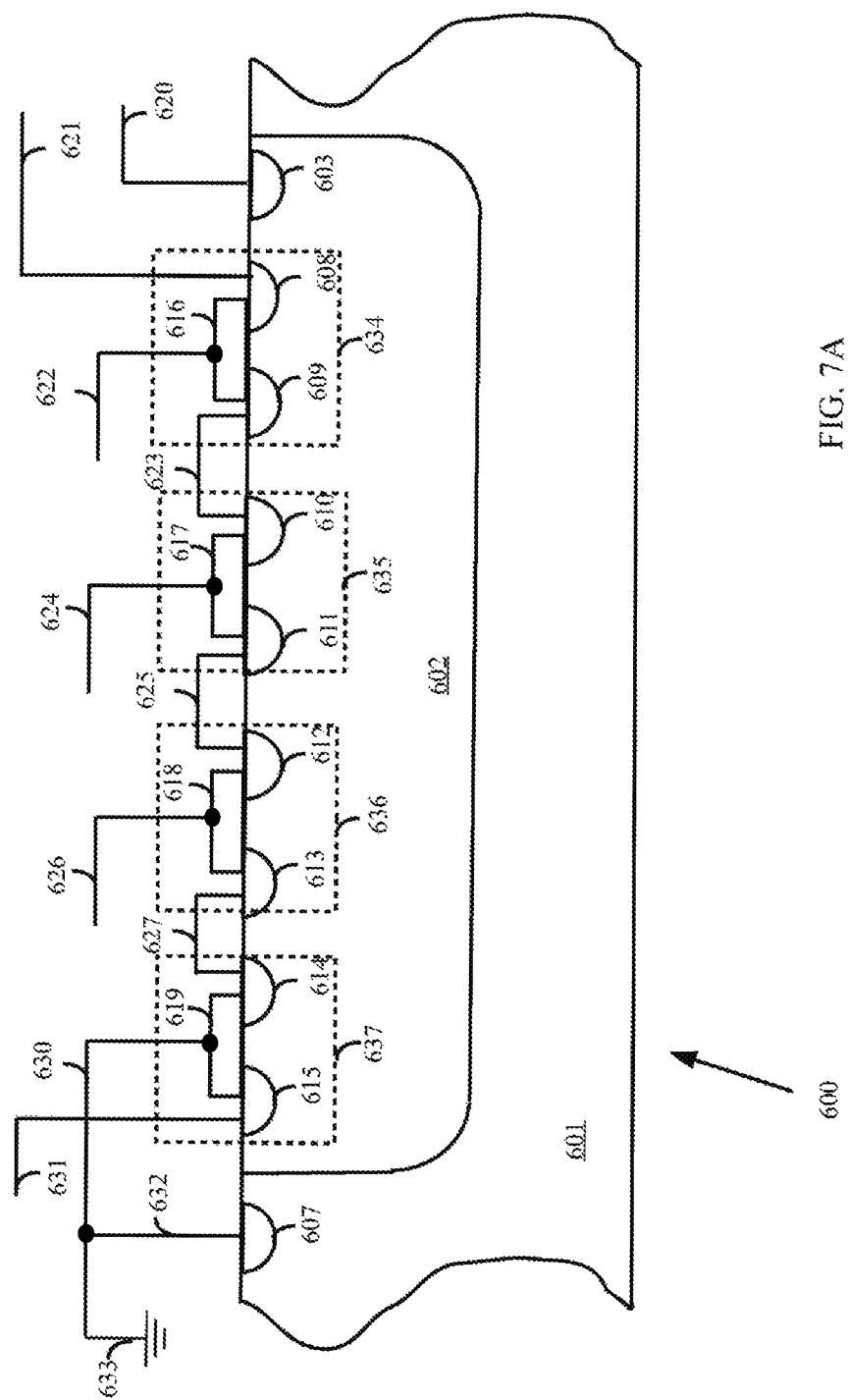
FIG. 7A presents a first embodiment of the cross section of the pixel circuit of FIG. 1C when realized in a single n-well on a p-substrate CMOS.

FIG. 7A depicts a first physical embodiment 600 of the implementation of modulation and biasing section 220 of FIG. 1C in CMOS. In this embodiment, the modulation and current source elements for each pixel are implemented in a single n-well 602 placed in a p-material substrate 601. P-substrate 601 is bulk biased to $V_{SS}$ (or ground), that is connected by conductor 633 and conductor 632 to p-implant 607 wherein p-implant 607 is more heavily p-doped than p-substrate 601. N-well 603 is biased to $V_{DDAR}$ ($V_{DD}$ array) over conductor 620

Modulation and biasing section 600 comprises MOSFET transistors 634, 635, 636, and 637 wherein all four MOSFET transistors are p-channel transistors placed in a single n-well 602. MOSFET transistor 634 comprises source 608, drain 609, and gate 616. Source 608 is connected is connected V_H over conductor 621, wherein V_H represents a global voltage delivered to all pixels of an array of pixels and wherein V_H is separate from other global voltages such as $V_{DDAR}$ and $V_{SS}$.

Transistor 634 and transistor 635 together function as a modulation section operative to create a modulated waveform incorporating gray scale modulation through transistor 634 and intensity control through transistor 635. Intensity control may serve to ensure that differing colors are present in an image at the desired color balance and to perform a dimming function for the entire display so observers in a dark environment are presented an image at a lower level of brightness while observers in a brightly lit environment can be presented with a brighter image. These requirements are extremely well known.

Gate 616 of transistor 634 is connected over conductor 622 to the output $S_{NEG}$ of an SRAM memory cell (not shown) after that of conductor 214 of FIG. 1B. In one embodiment gate 616 is connected to an output $S_{POS}$ in an instance wherein the data on the SRAM memory cell is inverted with 0 representing "on" and 1 representing "off." The source and function of $S_{NEG}$ and $S_{POS}$ are as previously described in the present application.

Drain 609 of transistor 634 is connected to source 610 of transistor 635 over conductor 623. Gate 617 of transistor 635 is connected to signal L_off over conductor 624. The function of L_off is as previously described in the present application for gate 229 of transistor 222 of FIG. 1C.

Drain 611 of transistor 635 is connected to source 612 of transistor 636 over conductor 625. Gate 618 of transistor 636 is connected to $V_{BIAS}$ over conductor 626. The function of $V_{BIAS}$ is previously described in the present application with respect to the gate of transistor 130 of FIG. 1A and also with respect to gate 232 of transistor 223 of FIG. 1C. Transistor 636 is a large L transistor that functions as a variable resistor when operated in saturation with resistance set by the $V_{BIAS}$ voltage applied to gate 618.

Drain 613 of transistor 636 is connected to source 614 of transistor 637 over conductor 627. Gate 619 is connected to $V_{SS}$ (or ground) over conductor 630 and conductor 633. Transistor 637 acts as a current source. in this configuration.

The output pix_out of transistor 637 is asserted through drain 615 over conductor 631. Pix_out comprises a modulated output at a desired voltage and current operative to drive an emissive device at a desired gray level and with a desired range of intensities.

The voltage-drop considerations presented in FIG. 1C and its associated text applies directly to configuration 600 of FIG. 7A.

Figure 7B:
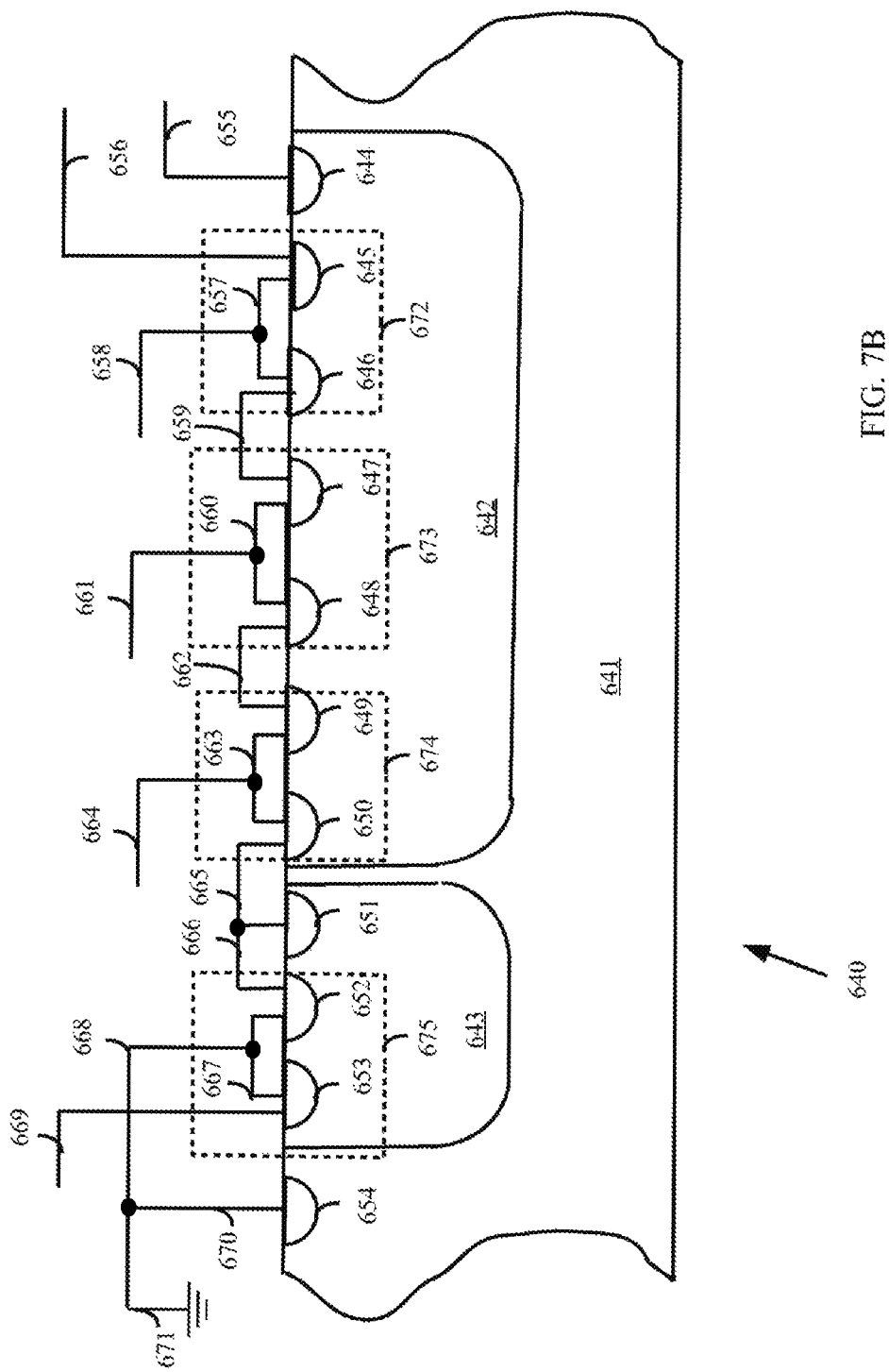
FIG. 7B presents a second embodiment of the cross section of the pixel circuit of FIG. 1C when realized in two n-wells on a p-substrate CMOS.

FIG. 7B presents an alternative embodiment 640 of circuit 220 of FIG. 1C implemented in a semiconductor substrate such as silicon. Embodiment 640 comprises a p-material substrate 641 with two n-wells 642 and 643. In one embodiment, n-well 642 and n-well 643 are bulk-biased to different voltages.

N-well 642 is bulk biased to $V_{DDAR}$ through n-implant 644 over conductor 655. N-well 643 is biased to the voltage found at drain 650 of transistor 674. P-material substrate 641 is biased to $V_{SS}$ 671 (or ground) as explained below.

The operation of transistors 672, 673, and 674 in n-well 642 is similar in respects to the operation of transistors 634, 635, and 636 in n-well 602 of FIG. 7A.

Source 645 of transistor 672 is connected to V_H over conductor 656. Gate 657 is connected to $S_{NEG}$ over conductor 658, wherein $S_{NEG}$ is a signal indicating the data state of an SRAM (not shown) such as that asserted on conductor 214 of FIG. 1B.

Drain 646 of transistor 672 is connected over conductor 659 to source 647 of transistor 673. Gate 660 of transistor 673 is connected over conductor 661 to intensity control signal L_off, which functions as described for gate 229 of transistor 222 of FIG. 1C.

Drain 648 of transistor 673 is connected by conductor 662 to source 649 of transistor 674. Gate 663 of transistor 674 is connected to $V_{BIAS}$ by conductor 664, wherein $V_{BIAS}$ functions as previously described in the present application with respect to the gate of transistor 130 of FIG. 1A and also with respect to gate 232 of transistor 223 of FIG. 1C. for FIG. 1C. As previously noted, transistor 674 is a large L transistor operative to act as a variable transistor when operated in saturation, responsive to the voltage level of $V_{BIAS}$. The output of transistor 674 is asserted by drain 650 onto conductor 665.

Drain 674 is connected by conductor 665 and conductor 666 onto n-implant 651 to bulk bias n-well 643 to the voltage on drain 674 and onto source 652 of transistor 675. Gate 667 of transistor 675 is connected to $V_{SS}$ (or ground) over conductor 668 and conductor 671. P-substrate 641 is biased to $V_{SS}$ over conductor 670 and conductor 671 through p-implant 654. Drain 653 of transistor 675 asserts modulation signal pix_out over conductor 669, wherein signal pix_out is previously described regarding FIG. 7A. In one embodiment n-implant is connected to upper rail voltage $V_{DD}$ of the backplane (not shown) and not to drain 650 of FET 674.

The differences between the single n-well pixel implementation 600 of FIG. 7A and the two n-well pixel implementation 640 of FIG. 7B are important to consider. The two n-well version of FIG. 7B has the advantage of establishing a lower threshold voltage $V_T$ on transistor 675, which creates the opportunity for a lower voltage level on source 652 of transistor 675. This in turn allows an enlarged voltage range for transistor 674 to remain in saturation, thereby improving the range of voltages available to drive an LED. Simulation results for one implementation in a 5-volt process demonstrate that the range of saturation voltages of transistor 675 of FIG. 7B may increase by approximately one additional volt over that of transistor 637 of FIG. 7A in the same 5-volt process.

A second difference is that the bulk voltage asserted on n-well 643 is also the voltage asserted on its source 652, which reduces the voltage between the n-well and drain substantially, making it easier to remain within the maximum breakdown voltage of the semiconductor process. This also have the effect of keeping the threshold voltage $V_T$ of transistor 675 substantially constant because the voltage asserted on n-well 643 tracks the voltage asserted on source 652.

Figure 8A:
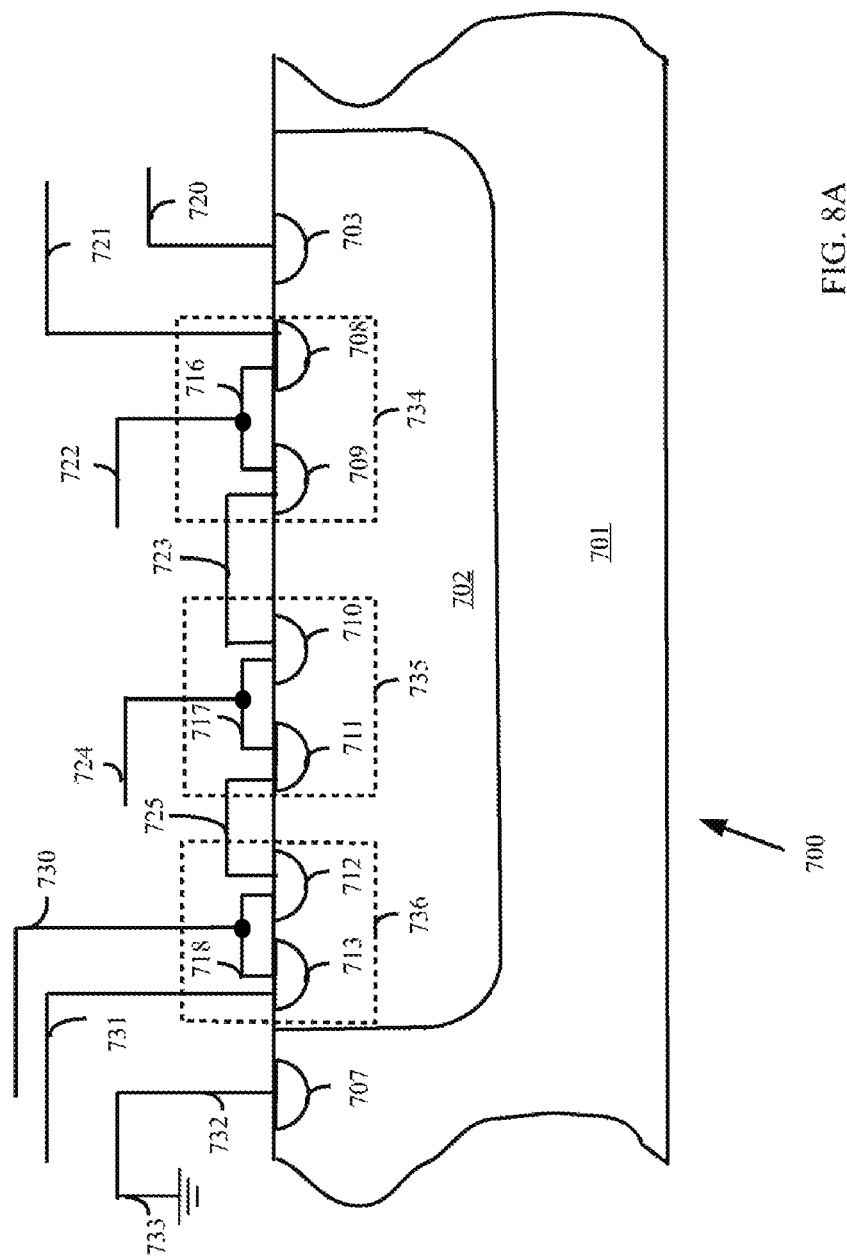
FIG. 8A presents a first cross section of the pixel circuit of FIG. 2C when realized in a single n-well on a p-substrate CMOS.

FIG. 8A depicts a part of a first physical implementation 700 of the current mirror circuit of FIG. 2C. A physical embodiment 775 of reference current mirror circuit comprising transistors 522 and 530 of FIG. 2C is presented on FIG. 9. Physical embodiment 700 presented in FIG. 8A comprises p-material substrate 701 and single n-well 702. P-channel transistors 734, 735 and 736 are formed in n-well 702.

P-material substrate 701 is bulk biased to $V_{SS}$ (or ground) at conductor 733 through p-implant 707 and conductor 732. N-well 702 is biased to $V_{DDAR}$ through n-implant 703 and conductor 720. P-implant 707 is doped more heavily than p-material substrate 701. N-implant 703 is doped more heavily than n-well 702, Transistor 734 is a large L transistor, with source connected to V_H over conductor 721. Gate 716 is connected to a reference current mirror circuit (not shown) over conductor 722. Transistor 734 is operative to mirror the reference current provided to gate 716 The output of transistor 734 is a stable current asserted on drain 709 of transistor 734. The current asserted on drain 709 of transistor 734 may differ from the reference current asserted on gate 716 of transistor 734, based on the physical implementation (W/L) of large L transistor 734. In fact, the ratio of W/L can be scaled up or down to make the current on drain 709 of transistor 734 either smaller or larger than the reference current.

Transistor 735 receives the stable current of drain 709 of transistor 734 on source 710 over conductor 723. Gate 717 is connected over conductor 724 to output $S_{NEG}$ of a binary memory device (not shown) such as conductor 514 of pixel circuit 500 of FIG. 2B. $S_{NEG}$ provides a voltage to gate 717 corresponding to the data state of the binary memory device. When $S_{NEG}$ is in an on state (low), gate 717 is biased to enable conductance from source 710 to drain 711.

Source 712 of transistor 736 is connected to drain 711 of transistor 735 over conductor 725. Gate 718 of transistor 736 is connected to control signal L_off over conductor 730. The function of signal L_off is previously described for FIG. 2C. Pix_out, delivered electrically by drain 713 of transistor 736 over conductor 731 to the anode of an LED (not shown), is a waveform operative to modulate the output at a desired gray scale level at a desired intensity relative to LEDs of other colors of that display.

Figure 8B:
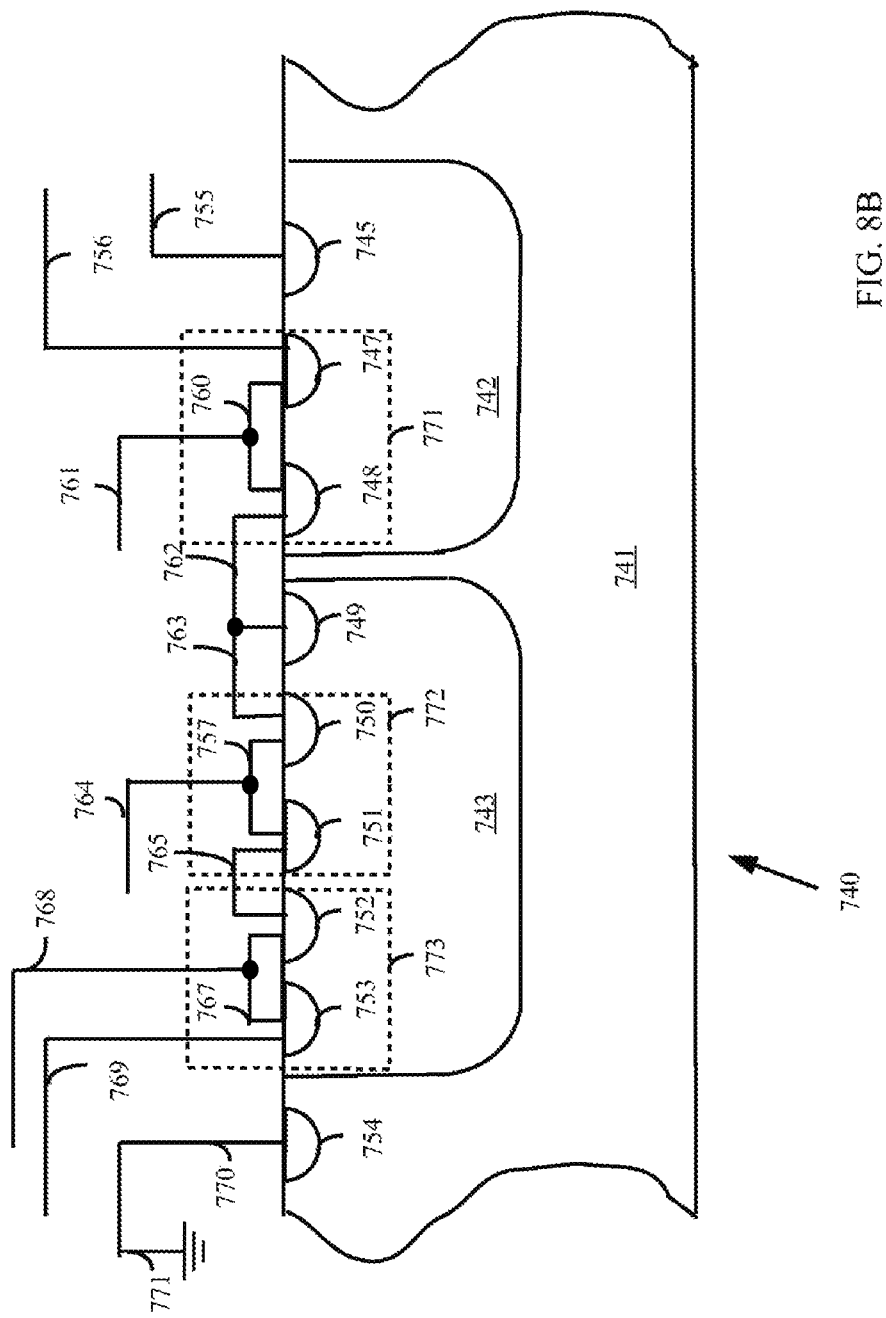
FIG. 8B presents a view of a modulation section of the pixel circuit of FIG. 2C when realized in two n-wells on a p-substrate CMOS.

FIG. 8B presents a second physical implementation 740 of the current mirror circuit of FIG. 2C. Current mirror reference circuit 775, based on transistors 522 and 530 of FIG. 2C, is presented in FIG. 9. Physical implementation 740 comprises p-material substrate 741 and n-wells 742 and 743. P-channel transistor 771 is realized in n-well 742, and p-channel transistors 772 and 773 are realized in n-well 743. Transistors 772 and 773 together form a modulation section for gray scale (pulse width) modulation and for relative intensity control of the colors. Reference current mirror circuit of transistors 522 and 530 of FIG. 2C (not shown) may also be implemented in n-well 742.

P-material substrate 741 is bulk biased to $V_{SS}$ (or ground) at conductor 771 through p-implant 754 and conductor 770. P-implant 754 is more heavily p-doped than p-material substrate 741. N-well 742 is biased to $V_{DDAR}$ over conductor 755 and n-implant 745, wherein n-implant 745 is more heavily n-doped than n-well 742. N-well 743 is biased to drain 748 of transistor 771 found in n-well 742 through n-implant 749 over conductor 762. N-implant 749 is more heavily n-doped than n-well 743. The doping of n-well 742 and n-well 743 may be substantially the same. In one embodiment, p-implant 749 is connected to upper rail voltage $V_{DD}$ of the backplane (not shown) and not to drain 748 of FET 771.

Source 747 of transistor 742 is connected to V_H over conductor 756. V_H is a global voltage independent of $V_{DDAR}$ and $V_{SS}$ that is supplied to all pixels regardless of the color of the emissive device at that pixel. Gate 760 of transistor 771 is connected to reference current $V_{REF}$ over conductor 761 such as may be generated by transistors 522 and 530 of FIG. 2C (not shown). Transistor 771 is a large L p-channel transistor. The output of transistor 771 is asserted on drain 748. Transistor 771 mirrors the reference current asserted on it. The current asserted on its drain 748 need not be identical to the reference current. The W/L ratio of transistor 771 may be scaled up or down to make the current asserted on drain 748 smaller or larger than the reference current. Drain 748 is connected to n-implant 749 by conductor 762 to bulk bias n-well 743 to the voltage asserted on drain 748.

Drain 748 is connected to source 750 of transistor 772 over conductors 762 and 763. Transistors 772 and 773, located in n-well 743, together form the modulation section of the pixel circuit. Gate 757 is connected to signal $S_{NEG}$ generated by a memory device (not shown) such as SRAM 500 of FIG. 2B. Transistor 772 acts as a switch to assert an on state voltage on drain 751 when the memory unit holds on state data, and otherwise is off. Changes in the data stored on the memory device will allow a series of sequential on and off states that, when viewed, give the appearance of an image with independent gray scale at each pixel.

Control signal L_off is used to apply a pulse width modulation signal separate from the pulse width modulation generated by $S_{NEG}$ onto gate 767 of transistor 773 over conductor 768. Transistor 773 acts as a switch responsive to L_off. This independent modulation is configured to modulate each of the colors of the display separately. This allows the LEDs to be operated in a color balanced manner. The output pix_out of transistor 773 is asserted onto drain 753, which is in turn connected over conductor 769 to the anode of an LED or other emissive device (not shown).

Implementation 740 of FIG. 8B offers advantages over implementation 700 of FIG. 8A. Use of the second n-well 743, which is effectively biased to the source of transistor 772 will effectively lower threshold voltage $V_T$ of both transistors 772 and 773. This arrangement also gives an enlarged voltage range for transistor 522 of FIG. 2C, as is explained for FIG. 8B. An additional improvement is that this arrangement is expected to improve the switching speed for both transistor 772 and 773, which has the potential to improve image quality.

Implementation 740 of FIG. 8B also offers some advantage over implementation 640 of FIG. 7B. The bias applied to n-well 743 of FIG. 8B is a static voltage whereas the bias applied to n-well 643 of FIG. 7B is a modulated voltage. The approach of implementation 740 eliminates any data dependence present in the performance of implementation 640 of FIG. 7B.

Figure 9:
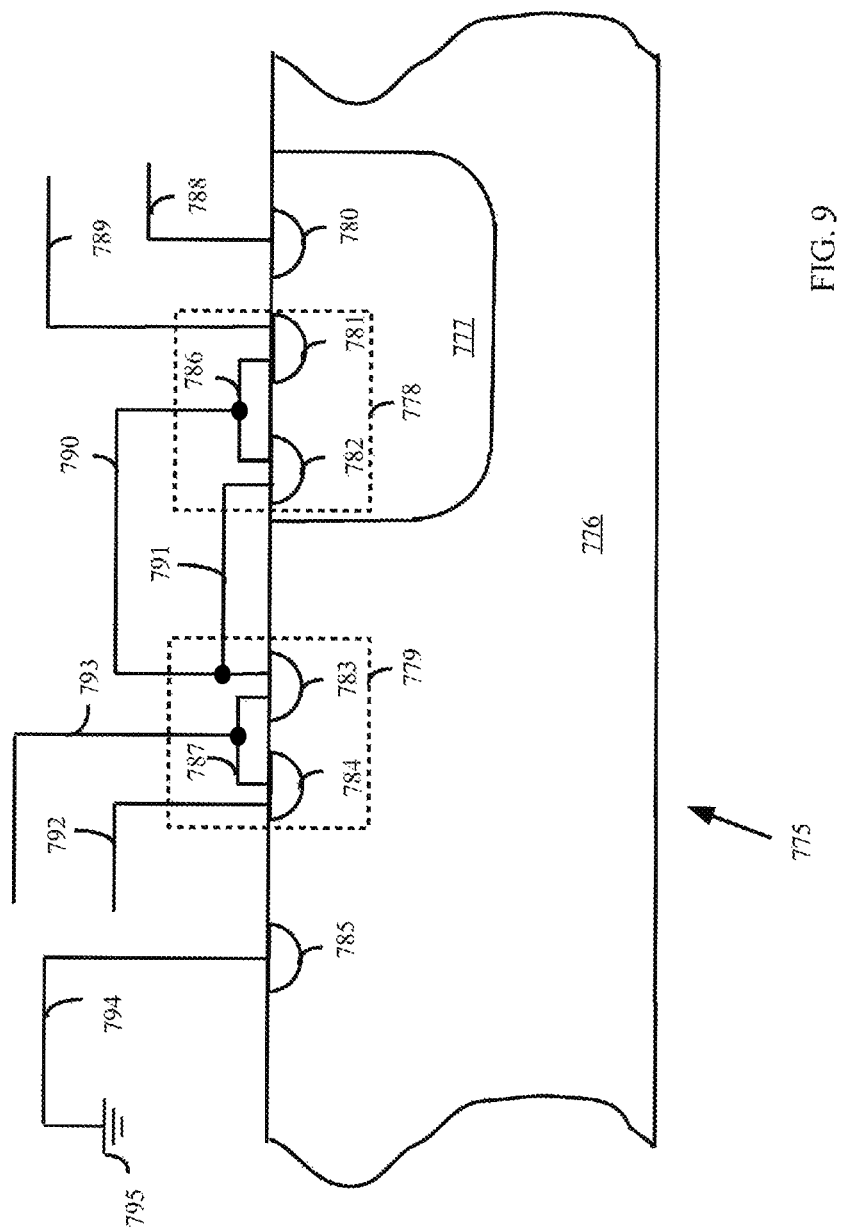
FIG. 9 presents a view of a current mirror reference forming a part of the pixel circuit of FIG. 2C compatible with the one-well implementation of FIG. 8A and the two n-well implementation of FIG. 8B.

FIG. 9 depicts a physical implementation 775 of the reference current mirror circuit of FIG. 2C. Reference current source 775 comprises p-substrate 776 and n-well 777. This physical implementation may be used with physical implementation 700 of FIG. 8A or with physical implementation 740 of FIG. 8B. It may also be used with physical implementation 600 of FIG. 7A or with physical implementation 640 of FIG. 7B. N-well 777 is bulk biased to $V_{DDAR}$ through n-implant 780 and conductor 788. N-implant 780 is n-doped more heavily than n-well 777. Source 781 of transistor 778 is connected to V_H over conductor 789. Gate 786 and drain 782 of transistor 778 are connected to drain 783 of n-channel transistor 779 over conductor 790 and conductor 791 respectively. These terminals of transistors 778 and 779 may also connected either to gate 716 of transistor 734 of FIG. 7A or to gate 760 of transistor 771 of FIG. 7B, thereby providing a current reference to either of those implementations. The terminals of transistors 778 and 779 may also be connected either to gate 716 of transistor 734 of FIG. 8A or to gate 760 of transistor 771 of FIG. 8B, thereby providing a reference current to either of those current mirrors. Transistor 779 is a large L transistor operative to act as a variable resistor when operated in saturation mode, thereby setting the voltage for the reference current mirror circuit. Source 784 of large L transistor 779 is connected to $V_{SS}$ over conductor 792. Gate 787 of transistor 779 is connected to $V_{BIAS}$ over conductor 793. $V_{BIAS}$ sets the resistance of large L transistor 779, thereby settings the voltage at its drain 783 as previously described. Bulk bias for p-substrate 776 is set at $V_{SS}$ through p-implant 785 which connects to $V_{SS}$ through connectors 794 and 795.

P-channel transistor 778 is the current reference device, with its output voltage set by n-channel transistor 779. N-channel transistor 779 has a very long channel that creates an overdrive situation that serves to reduce the mismatching of the threshold voltage. It also reduces the impact of transient noise on $V_{SS}$.

In one embodiment, n-well 777 of FIG. 9 in which p-channel transistor 778 is implemented is the same n-well 702 of FIG. 8A in which p-channel transistors 734, 735 and 736 are implemented. In one embodiment, n-well 777 of FIG. 9 in which p-channel 778 is implemented is the same n-well 742 of FIG. 8B in which p-channel transistor 771 is implemented.

Thus, the circuits described in FIGS. 8A, 8B and 9 provide substantial capability to drive an emissive device such as an LED. The circuits provide a range of modulated voltages that are quite capable of driving LEDs with both gray scale and adjustable peak intensity.

These and other benefits accrue from the operation of an emissive display using the various inventive embodiments herein disclosed. Those of ordinary skill in the art will recognize minor variations upon the various elements of this disclosure which are intended to be encompassed within the presented invention.

What is claimed is:

1. A backplane operative to drive an array of emissive pixel elements, wherein each pixel element comprises a pixel circuit drive element and an emissive element, and wherein the pixel circuit drive element comprises a memory cell, a current providing element, and a modulation element, wherein the current providing element comprises a large L FET and a second FET transistor operative to provide a desired current at a desired voltage to a current mirror element, the desired voltage being set by a bias voltage applied to the gate of the large L FET and the FET transistor is operated in diode mode with its gate and drain connect to each other, to the large L FET and to the gate of the mirror current FET, wherein the current mirror FET is a large L FET, and wherein the modulation element comprises a FET configured as a pulse width modulation switch operative to impose pulse width modulation on a current applied to it wherein the pulse width data modulation switch is responsive to the data state of the memory cell, and wherein the voltage and current output of the modulation element is asserted onto a first electrode of the emissive element and the second electrode of the emissive element is connected to a second global voltage, and wherein the difference between the voltage applied to the first electrode of the emissive element and the voltage applied to the second electrode of the emissive element is within the required voltage range for the emissive element to emit light.

2. The backplane of claim 1, wherein the modulation element of each pixel circuit drive element comprises a FET wherein the gate of the FET is modulated by a non-data driven pulse width modulation signal operative to control the intensity of the emissive element associated with that pixel circuit drive element without regard for the data state of the memory cell of the pixel circuit drive element and wherein the non-data driven FET and the data driven FET are connected in series.

3. The backplane of claim 1, wherein the modulation element comprises p-channel FETs in an n-well.

4. The backplane of claim 1, wherein the current providing element comprises p-channel FETs as the current mirror FET and the second FET in an n-well and the large L FET as an n-channel FET in a p-well or directly on a p-substrate.

5. The backplane of claim 3, wherein the voltage applied to the second electrode of each emissive element of each pixel element is lower than the upper rail voltage of the array.

6. The backplane of claim 5, wherein the voltage applied to the second electrode of each emissive element of each pixel element is lower than the lower rail voltage (ground) of the array.

7. The backplane of claim 1, wherein the current providing element and the modulation element are placed in series.

8. The backplane of claim 1, wherein the memory cell is an SRAM memory device.

9. The backplane of claim 1, wherein the emissive element is a light emitting diode.

10. The backplane of claim 1, wherein substantially all of the backplane is fabricated in a single piece of single crystal silicon.

11. The backplane of claim 1, wherein the FETs of the modulation element are p-channel FETs placed in a first n-well of a p-substrate material and the p-channel FETs of the current providing element are placed in a second n-well of the same p-substrate material, and wherein the second n-well is biased to a voltage different than the bias voltage of the first n-well.

12. The backplane of claim 11, wherein the first n-well is biased to the upper rail voltage of the device.

13. The backplane of claim 1, wherein the emissive elements emit a plurality of colors of light.

14. The backplane of claim 1, wherein the pixel drive circuit elements associated with a first color require a different bias voltage on its large L FET to the bias voltage required for the pixel drive circuit elements associated with a second color.

* * * * *